US011231812B2

(12) United States Patent
Moscovich et al.

(10) Patent No.: US 11,231,812 B2
(45) Date of Patent: Jan. 25, 2022

(54) SYSTEM AND METHOD FOR CALIBRATING A TOUCH SENSOR

(71) Applicant: Sensel, Inc., Sunnyvale, CA (US)

(72) Inventors: Tomer Moscovich, Sunnyvale, CA (US); Scott Isaacson, Sunnyvale, CA (US); Shuangming Li, Sunnyvale, CA (US); Ilya Daniel Rosenberg, Sunnyvale, CA (US); John Aaron Zarraga, Sunnyvale, CA (US); Samuel Palomino, Sunnyvale, CA (US)

(73) Assignee: Sensel, Inc., Sunnyvale, CA (US)

( * ) Notice: Subject to any disclaimer, the term of this patent is extended or adjusted under 35 U.S.C. 154(b) by 0 days.

(21) Appl. No.: 17/207,546

(22) Filed: Mar. 19, 2021

(65) Prior Publication Data

US 2021/0294479 A1   Sep. 23, 2021

Related U.S. Application Data

(60) Provisional application No. 62/992,077, filed on Mar. 19, 2020.

(51) Int. Cl.
*G06F 3/041* (2006.01)
*G06F 3/01* (2006.01)
*G06F 3/044* (2006.01)
*G06F 3/045* (2006.01)

(52) U.S. Cl.
CPC .......... *G06F 3/04186* (2019.05); *G06F 3/016* (2013.01); *G06F 3/044* (2013.01); *G06F 3/045* (2013.01); *G06F 3/04166* (2019.05)

(58) Field of Classification Search
None
See application file for complete search history.

(56) References Cited

U.S. PATENT DOCUMENTS

2017/0242539 A1*   8/2017   Mani ..................... G06F 3/0447

* cited by examiner

*Primary Examiner* — Stephen T. Reed
(74) *Attorney, Agent, or Firm* — Run8 Patent Group, LLC; Peter Miller

(57) ABSTRACT

A method for calibrating a touch sensor includes: at a calibration system during a calibration routine, applying a probe, at a target selection force, to a sequence of locations on a touch sensor surface of a touch sensor; at the touch sensor, capturing a sequence of touch images representing magnitudes of forces detected on the touch sensor surface during the calibration routine; fusing the sequence of touch images into a response map representing magnitudes of forces detected on the touch sensor surface by the touch sensor responsive to application of the target selection force on the touch sensor surface by the probe during the calibration routine; generating a force compensation map defining threshold forces for detecting selections at the target selection force on the touch sensor surface based on the response map.

20 Claims, 7 Drawing Sheets

SYSTEM AND METHOD FOR CALIBRATING A TOUCH SENSOR

CROSS-REFERENCE TO RELATED APPLICATIONS

This Application claims priority to U.S. Provisional Patent Application No. 62/992,077, filed on 19 Mar. 2020, which is incorporated in its entirety by this reference.

This Application is related to U.S. patent application Ser. No. 14/499,001, filed on 26 Sep. 2014, and to U.S. patent application Ser. No. 17/191,636, filed on 3 Mar. 2021, each of which is incorporated in its entirety by this reference.

TECHNICAL FIELD

This invention relates generally to the field of touch sensors and more specifically to new and useful calibration methods in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
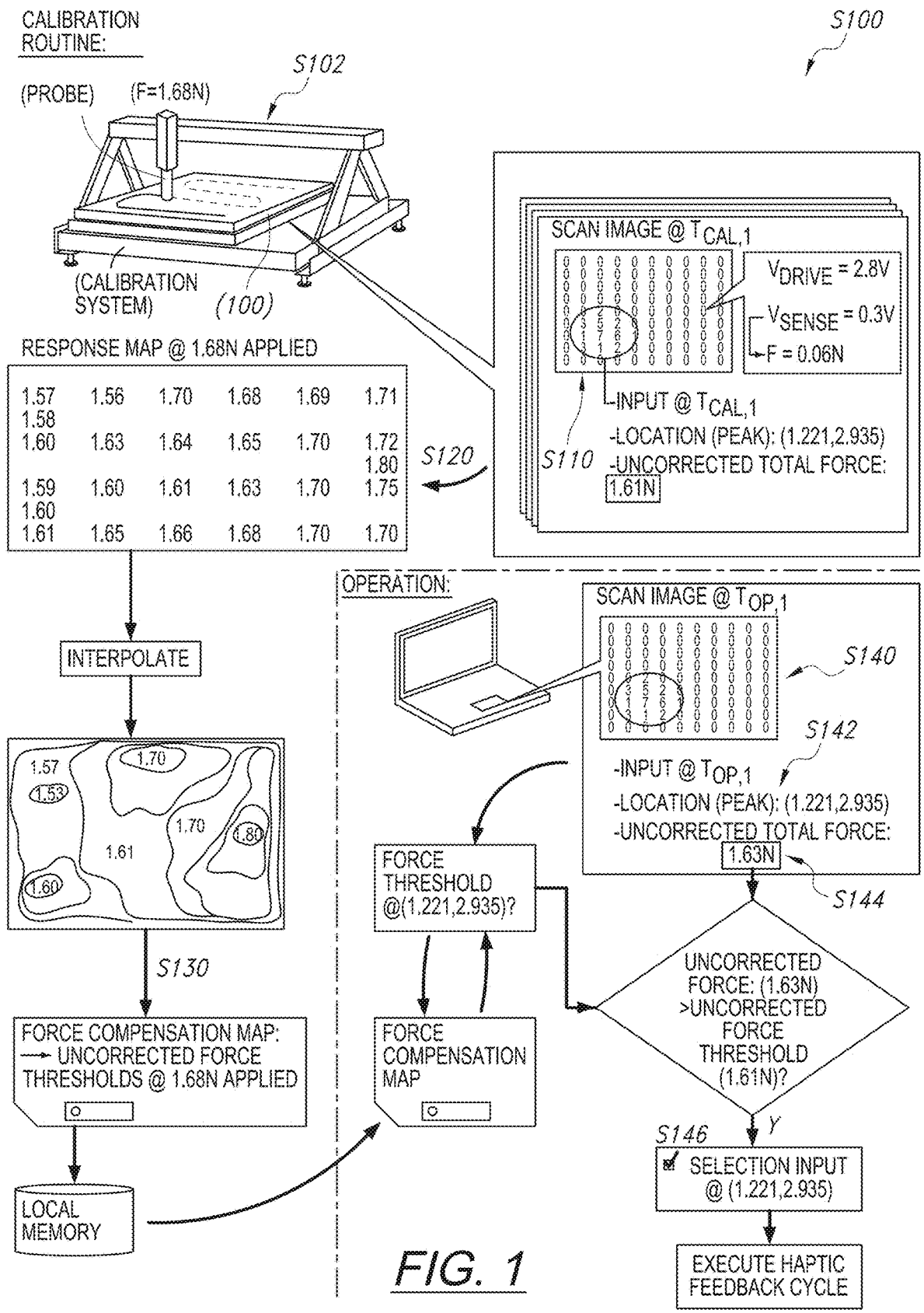
FIG. 1 is a flowchart representation of a first method.

As shown in FIG. 1, a first method S100 for calibrating a touch sensor includes: at a calibration system during a calibration routine, applying a probe, at a target selection force, to a sequence of locations on a touch sensor surface of a touch sensor in Block S102; at the touch sensor, capturing a sequence of touch images representing magnitudes of forces detected on the touch sensor surface during the calibration routine in Block S110; fusing the sequence of touch images into a response map representing magnitudes of forces detected on the touch sensor surface by the touch sensor responsive to application of the target selection force on the touch sensor surface by the probe during the calibration routine in Block S120; and generating a force compensation map defining threshold forces for detecting selections at the target selection force on the touch sensor surface based on the response map in Block S130. The first method S100 also includes, during operation, at the touch sensor: capturing a first touch image representing magnitudes of forces detected on the touch sensor surface in Block S140; based on the first touch image, detecting a first input at a first location on the touch sensor surface in Block S142 and detecting a first force magnitude of the first input in Block S144; and, in response the first force magnitude exceeding a first threshold force assigned to the first location by the force compensation map, registering a first selection at the first location on the touch sensor surface in Block S146.

Figure 2:
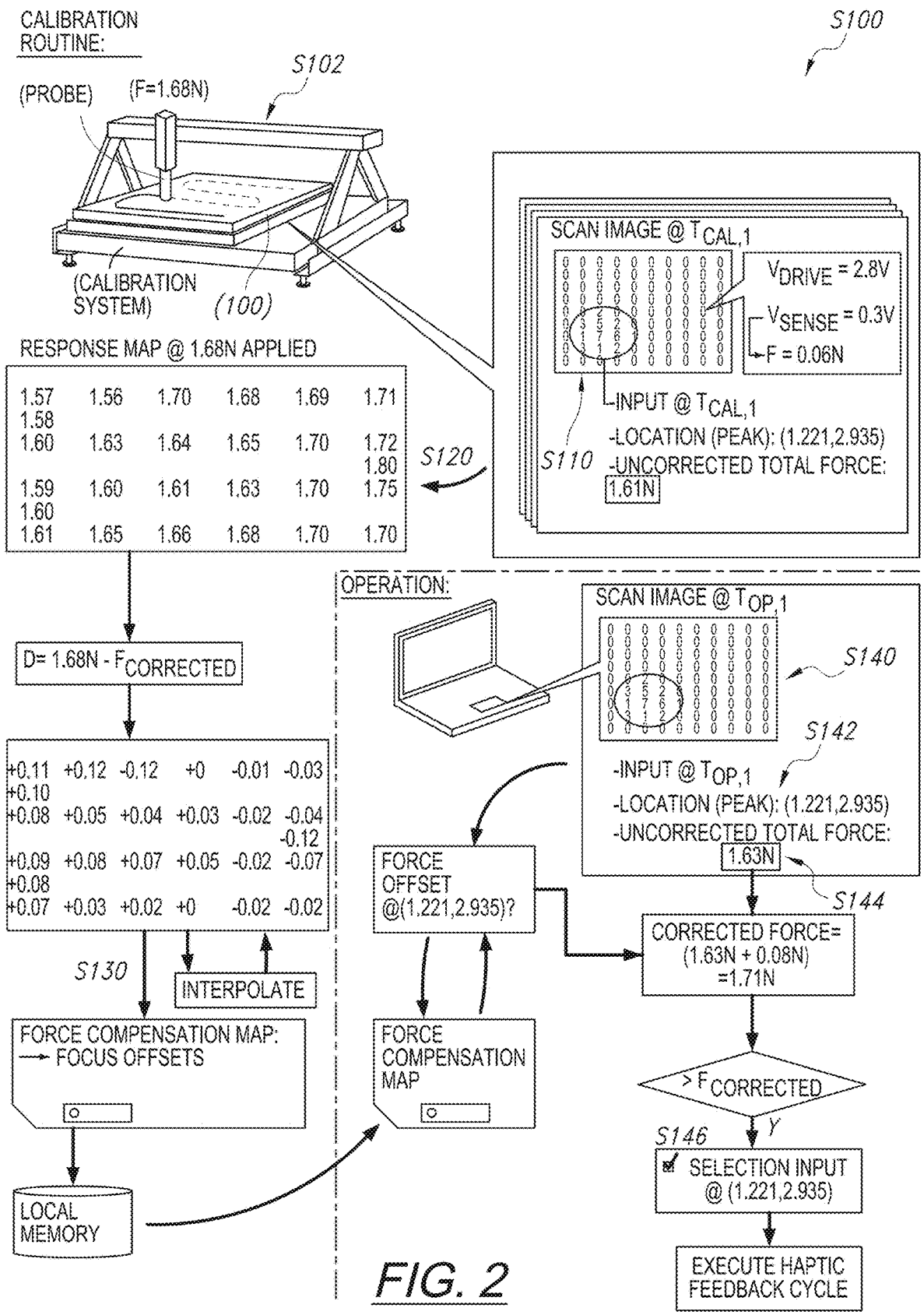
FIG. 2 is a flowchart representation of one variation of the first method.
Figure 3:
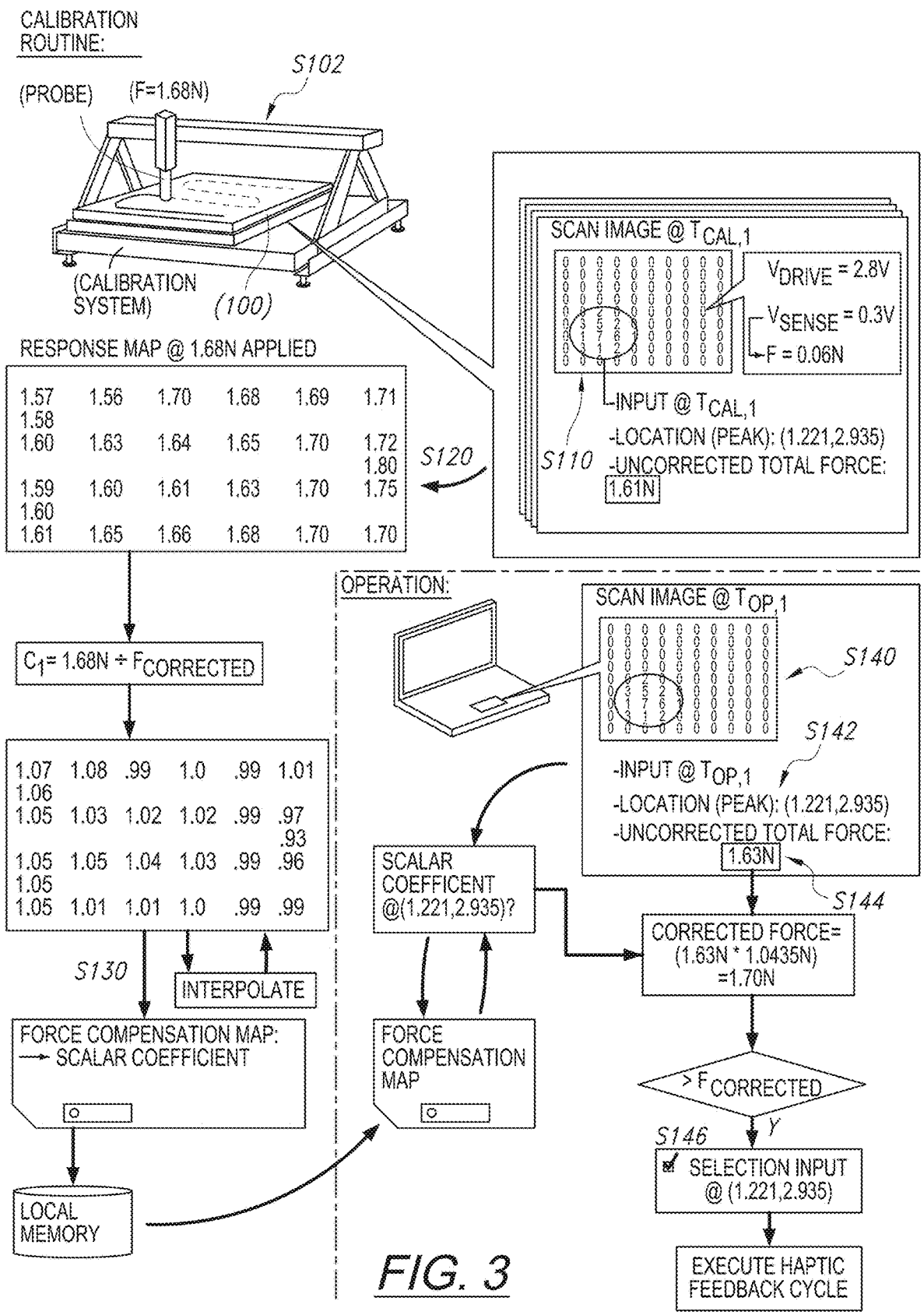
FIG. 3 is a flowchart representation of one variation of the first method.

One variation of the first method S100 shown in FIGS. 2 and 3 includes: at a calibration system during a calibration routine, applying a probe, at a reference force, to a sequence of locations on a touch sensor surface of a touch sensor in Block S102; at the touch sensor, capturing a sequence of touch images representing magnitudes of forces detected on the touch sensor surface during the calibration routine in Block S110; fusing the sequence of touch images into a response map representing magnitudes of forces detected on the touch sensor surface by the touch sensor responsive to application of the reference force on the touch sensor surface by the probe during the calibration routine in Block S120; and generating a force compensation map defining correction functions for calibrating forces detected on the touch sensor surface based on the response map in Block S130. This variation of the first method S100 also includes, during operation, at the touch sensor: capturing a first touch image representing magnitudes of forces detected on the touch sensor surface in Block S140; based on the first touch image, detecting a first input at a first location on the touch sensor surface in Block S142 and detecting a first uncorrected force magnitude of the first input in Block S144; and calculating a first force magnitude of the first input based on the first uncorrected force magnitude and a first correction function assigned to the first location by the force compensation map in Block S146.

1.1 Applications

Generally, the first method S100 can be executed by a touch sensor—in conjunction with a calibration system—to calibrate input force thresholds across an area of the touch sensor and thus compensate for manufacturing variance and manufacturing defects within the touch sensor in order to enable more accurate and repeatable detection and responses to inputs across the touch sensor surface as a function of applied force.

In particular, the touch sensor is configured to detect a location and a force magnitude of an input applied over a touch sensor surface based on changes in resistance between drive electrode and sense electrode pairs—arranged beneath a force-sensitive layer exhibiting changes in local contact (or bulk) resistance responsive to applied force—within a sensor array. However, manufacturing inconsistencies may yield: local variations in the thickness of the force-sensitive layer; variations in surface profile of the force-sensitive layer abutting drive electrode and sense electrode pairs arranged across a substrate; flatness deviations across the substrate; air caught between the substrate and the force-sensitive layer; lifting traces edges along drive electrodes and sense electrodes; and/or dust or particulate between the substrate and the force-sensitive layer that inhibit contact between drive electrode and sense electrode pairs and the force-sensitive layer; etc. Such manufacturing inconsistencies and defects may produce non-linear or unpredictable relationships between resistance across drive electrode and sense electrode pairs and force magnitudes of input applied to adjacent regions of the touch sensor surface. For example, material and geometry inconsistencies across the touch sensor can: yield a first change in detected resistance between a first drive electrode and sense electrode pair responsive to application of a first input of a first force magnitude on the touch sensor surface over this first drive electrode and sense electrode pair; and a second change in resistance—different from the first change in resistance—between a second drive electrode and sense electrode pair responsive to application of a second input of this same force magnitude on the touch sensor surface over this second drive electrode and sense electrode pair. In this example, the touch sensor (e.g., a controller within the touch sensor) can: detect different voltages across the first and second sense electrode pairs when the first and second drive electrodes are driven to the same reference potentials during application of the first and second inputs on the touch sensor surface; and interpret different force magnitudes at the first and second inputs based on the different voltages detected at the first and second sense electrodes. Accordingly, the touch sensor may achieve inconsistent and inaccurate interpretation of inputs of the same force magnitude at different locations on the touch sensor surface.

1.1.1 Force Correction Functions

The touch sensor can therefore execute Blocks of the first method S100 in cooperation with the calibration system (e.g., prior to deployment of the touch sensor in a user-facing application) in order: to record a sequence of voltage (or resistance) values across drive electrode and sense electrode pairs in the sensor array during application of inputs of known (or controlled, predefined) calibration force magnitudes across the touch sensor surface; and to generate and store a force compensation map (or calibration image, calibration force lookup table, etc.) that represents relationships between true force magnitudes of inputs applied to the touch sensor surface and force magnitudes of these inputs interpreted by the touch sensor, such as in the form of linear scaling functions, nonlinear scaling functions, or force offsets for individual drive electrode and sense electrode pairs or clusters of drive electrode and sense electrode pairs across the sensor array, as shown in FIGS. 2 and 3.

Later, during operation, the touch sensor can: read voltages (or resistances) from the array of drive electrode and sense electrode pairs during a scan cycle; interpret uncorrected force magnitudes of inputs applied to the touch sensor surface during this scan cycle based on these voltages (or resistances); access the force compensation map from local memory; scale, offset, or otherwise correct (or "normalize") these uncorrected force magnitudes according to the force compensation map; and then output the locations and corrected force magnitudes of inputs thus detected on the touch sensor surface, such as in the form of a corrected touch image.

1.1.2 Corrected Selection Force Thresholds

In another example shown in FIG. 1, the touch sensor can be configured: to interpret an input of force magnitude greater than 1.68 Newtons (or approximately 165 grams) on the touch sensor surface as a "click" (or "selection") input; and to respond to this click input by executing a feedback cycle, such as by vibrating the touch sensor surface and/or outputting an audible "click" sound. However, manufacturing variations and defects can cause the touch sensor to interpret a range of force magnitudes across the touch sensor surface as equal to the target selection force of 1.68 Newtons, such as from as little at 1.0 Newton to as much at 2.5 Newtons.

Therefore, the calibration system can apply a calibrated target selection force of 1.68 Newtons (i.e., approximately 165 grams) to the touch sensor surface during a calibration routine. The touch sensor (or the calibration system) can then execute Blocks of the first method S100 to: calculate uncorrected force magnitudes of inputs applied across the touch sensor surface during the calibration routine based on voltage (or resistance) changes read from the sense electrodes; and generate a force compensation map that sets these uncorrected forces as the threshold forces for detecting click inputs at corresponding locations across the touch sensor surface.

Later during operation, the touch sensor can: detect an input of a first uncorrected force magnitude at a first location on the touch sensor surface based on a change in voltage (or resolution) detected at a first sense electrode (or a first cluster of sense electrodes) in the sensor array; retrieve a first threshold force for detecting a click input at the first location from the force compensation map; and then selectively register the input as a click input and execute a feedback cycle accordingly if the first uncorrected force magnitude exceeds the first threshold force.

1.1.3 Software-Level Calibration

The touch sensor can therefore cooperate with the calibration system to execute Blocks of the first method S100 to: compensate and correct for manufacturing defects and inconsistencies that may affect interpretation of force magnitudes of inputs on the touch sensor surface; increase the accuracy of force values and/or force distributions detected across the touch sensor surface; improve the consistency of force-dependent haptic feedback issued by the touch sensor; and improve the consistency of force-dependent command functions executed by the touch sensor surface (or by a connected or integrated device) in response to inputs detected on the touch sensor surface.

Furthermore, by scaling or otherwise correcting such force inputs between collection of raw voltage (or resistance) data and generation of a touch input during a scan cycle based on the force compensation map, the touch sensor can also exhibit greater tolerance to manufacturing defects, inconsistencies, and/or materials standards, thereby reducing manufacturing costs and/or increasing manufacturing yield without significant reduction in accuracy or consistency force magnitudes interpreted and handled by the touch sensor.

The first method S100 is described herein as executed by the touch sensor, which can be subsequently and/or concurrently integrated into or connected to an electronic device, such as a laptop, tablet, or smartphone to detect and characterize inputs to these devices. However, Blocks of the first method S100 can additionally or alternatively be executed by a calibration system, a computer network, and/or a remote computing system.

1.2 Touch Sensor

As shown in FIG. 1, the touch sensor that includes: a grid array of drive electrode and sense electrode pairs patterned across a substrate (e.g., a rigid fiberglass PCB); a controller configured to drive the array of drive electrodes (e.g., to a reference voltage potential) and to read voltages (or other electrical signals) from the array of sense electrodes; and a force-sensitive layer interposed between the touch sensor surface and the array of drive electrode and sense electrode pairs, defining a force-sensitive material that exhibits variations in local contact resistance across drive electrode and sense electrode pairs (or variations in local bulk resistance across drive electrode and sense electrode pairs) as a function of force applied to the touch sensor surface.

In this configuration, application of a localized force to the touch sensor surface drives the force-sensitive layer into contact with adjacent drive electrode and sense electrode pairs in the sensor array, thereby: locally reducing the contact resistance between the force-sensitive layer and these adjacent sense electrodes; decreasing the resistances across these drive electrode and sense electrode pairs (e.g., manifesting as increased voltages at the sense electrodes when the drive electrodes are driven to a reference potential) as a function of (e.g., proportional to) the magnitude of the applied force.

Accordingly, the controller is configured to: drive each column of drive electrodes in the sensor array to a reference potential (e.g., while floating all other columns of drive electrodes); read (e.g., record, sample) a set of voltages from corresponding rows of sense electrodes; and transform the set of voltages into a force image (or a "pressure map") that represents force magnitudes applied across the touch sensor surface and carried into each drive electrode and sense electrode pair in the sensor array during a scan cycle.

1.3 Calibration System

As shown in FIG. 1, the calibration system includes: a control module; a touch sensor receptacle configured to receive and locate the touch sensor; a probe; a boom supporting the probe and configured to drive the probe toward the touch sensor surface of the touch sensor; an actuation subsystem configured to scan the probe laterally and longitudinally across the touch sensor surface; and a force (or pressure) sensor configured to detect a force magnitude of the probe applied normal to the touch sensor surface.

In one implementation, the probe defines a rigid, flat, circular contact surface approximately one square centimeter in area. In another implementation, the probe includes a silicone depressor defining a geometry approximating an adult human index finger. In yet another implementation, the probe defines a tapered geometry approximating a writing stylus.

1.3.1 Calibration Routine

During a calibration routine, once the touch sensor is loaded into the receptacle, the control module can retrieve a target selection force assigned for the touch sensor surface, such as a target selection force of 1.68 Newtons (or approximately 165 grams) in order to calibrate (or "tune") the touch sensor to detect "click" inputs of force magnitudes greater than this target selection force across the touch sensor surface and to respond accordingly (e.g., by vibrating the touch sensor during a haptic feedback cycle). The control module can also load a calibration path for the touch sensor, such as a preplanned serpentine or boustrophedonic path defining linear path sections offset according to a target calibration resolution (e.g., 10% of the total width of the touch sensor surface) and inset from the perimeter of the touch sensor surface (e.g., by 5% of the width of the touch sensor surface to produce nine parallel and offset linear path sections of the calibration path). The control module can then: advance the boom to drive the probe downward into contact with the touch sensor surface of the touch sensor; and implement closed-loop controls to drive the force magnitude applied by the probe against the touch sensor surface up to the target selection force. Upon reaching this target selection force, the control module can: drive the actuation subsystem to sweep the probe across the calibration path; and implement closed-loop controls to maintain the force applied by the probe to the touch sensor surface at (e.g., within 1% of) the target selection force. (Alternatively, the control module can drive the actuation subsystem to sweep the receptacle and the touch sensor along the calibration path relative to the probe.) Upon reaching the conclusion of the calibration path, the control module can retract the probe and release the touch sensor.

In one example, during this calibration routine, the control module drives the actuation subsystem at a continuous speed that traverses the center of the probe over one drive electrode and sense electrode pair in the touch sensor per scan cycle executed by the touch sensor (i.e., given a sampling rate of the touch sensor). Accordingly, the touch sensor can capture one touch image representing application of the center of the probe over each drive electrode and sense electrode pair. The touch sensor can then derive a force compensation map from these raw touch images in Blocks S120 and S130, as described below.

In another example, during this calibration routine, the control module drives the actuation subsystem at a continuous speed that moves the center of the probe from located directly over one drive electrode and sense electrode pair in the touch sensor to located directly over an adjacent drive electrode and sense electrode pair over multiple (e.g., three) consecutive scan cycles executed by the touch sensor. Accordingly, the touch sensor can capture multiple touch images representing application of the center of the probe near each drive electrode and sense electrode pair. For each drive electrode and sense electrode pair along the calibration path of the probe, the touch sensor can: identify a subset of touch images the depict a region of the probe located over the drive electrode and sense electrode pair; calculate a weight of each touch image in the subset based on a distance from the drive electrode and sense electrode pair to a center of the probe represented in the image; and calculate a composite touch image representing the force response of this drive electrode and sense electrode pair based on a weighted average of these touch images. The touch sensor can then derive a force compensation map from these composite touch images in Blocks S120 and S130, as described below.

In yet another example, during this calibration routine, the control module: intermittently drives the actuation subsystem through a sequence of waypoints along the calibration while maintaining contact between the probe and the touch sensor surface; and dwells the probe against the touch sensor surface at the target selection force at each waypoint. Accordingly, for each waypoint, the touch sensor can: capture multiple touch images representing application of the probe at the waypoint; select one touch image exhibiting minimum noise (e.g., jitter, bounce) in this set of touch images; and store this touch image as representing application of the probe at the target selection force over an adjacent drive electrode and sense electrode pair. The touch sensor can then derive a force compensation map from these select touch images in Blocks S120 and S130, as described below.

In a similar implementation, during this calibration routine, the control module sequentially: drives the actuation to locate the probe over a waypoint; advances the boom downward to drive the probe into contact with the touch sensor surface up to the target selection force; retracts the boom to release the probe from the touch sensor surface; drives the actuation to locate the probe over a next waypoint; and repeats this process for each remaining waypoint along the calibration path. Accordingly, for each waypoint, the touch sensor can: capture multiple touch images representing application of the probe at the waypoint; select one touch image in this set of touch images exhibiting a maximum or peak force; and store this touch image as representing application of the probe at the target selection force over an adjacent drive electrode and sense electrode pair. The touch sensor can then derive a force compensation map from these select touch images in Blocks S120 and S130, as described below.

However, the calibration system can drive the probe against the touch sensor surface in any other way, along any other calibration path, and according to any other loading schema.

1.3.2 Multiple Probes

In one variation, the calibration system includes multiple discrete and offset probes, each supported by one boom (e.g., one linear actuator) and coupled to one force (or pressure) sensor. In this variation, the calibration system can implement the foregoing methods and techniques to concurrently drive the set of probes into contact with the touch sensor surface at the target selection force, such as along contiguous segments of the calibration path or at discrete groups of waypoints across the touch sensor surface. For example, the calibration system can include ten probes located at a common, fixed pitch distance spanning the width of the touch sensor surface; accordingly, the calibration system can simultaneously sweep the ten probes linearly along a single, contiguous linear calibration path across the touch sensor surface.

However, the calibration system can include any other quantity or arrangement of probes and can sweep these probes across the touch sensor surface according to any other calibration path.

1.4 Calibration Images and Corrected Selection Threshold

Block S110 of the first method S100 recites, at the touch sensor, capturing a sequence of touch images representing magnitudes of forces detected on the touch sensor surface during the calibration routine; and Block S120 of the first method S100 recites fusing the sequence of touch images into a response map representing magnitudes of forces detected on the touch sensor surface by the touch sensor responsive to application of the target selection force on the touch sensor surface by the probe during the calibration routine.

Figure 4A:
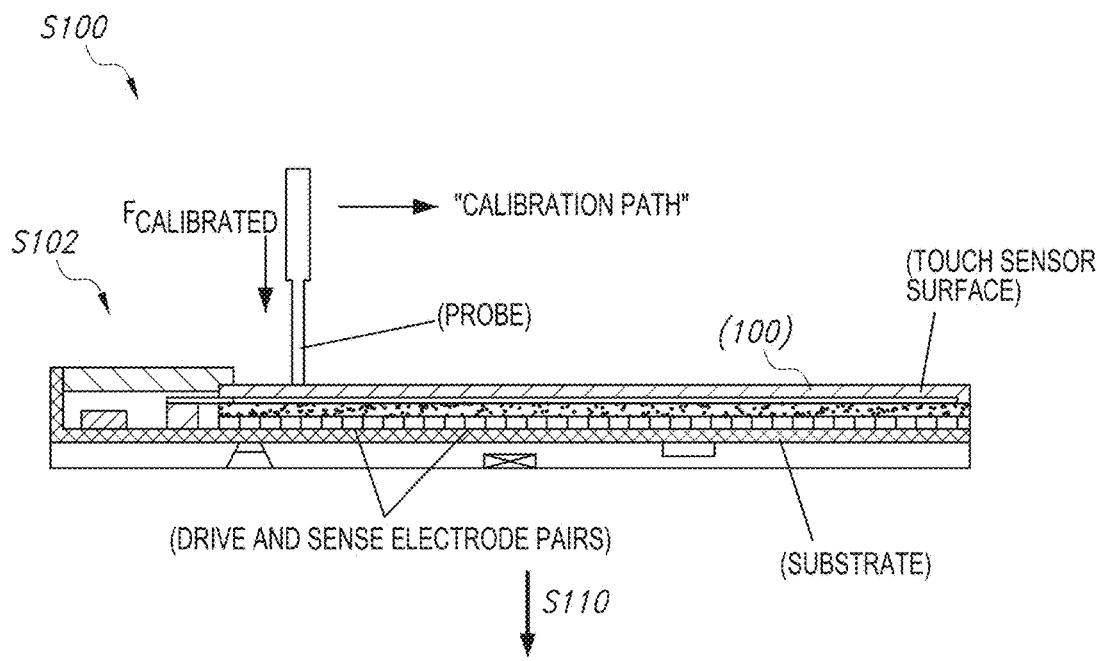
FIGS. 4A and 4B are a flowchart representation of one variation of the first method.
Figure 4A:
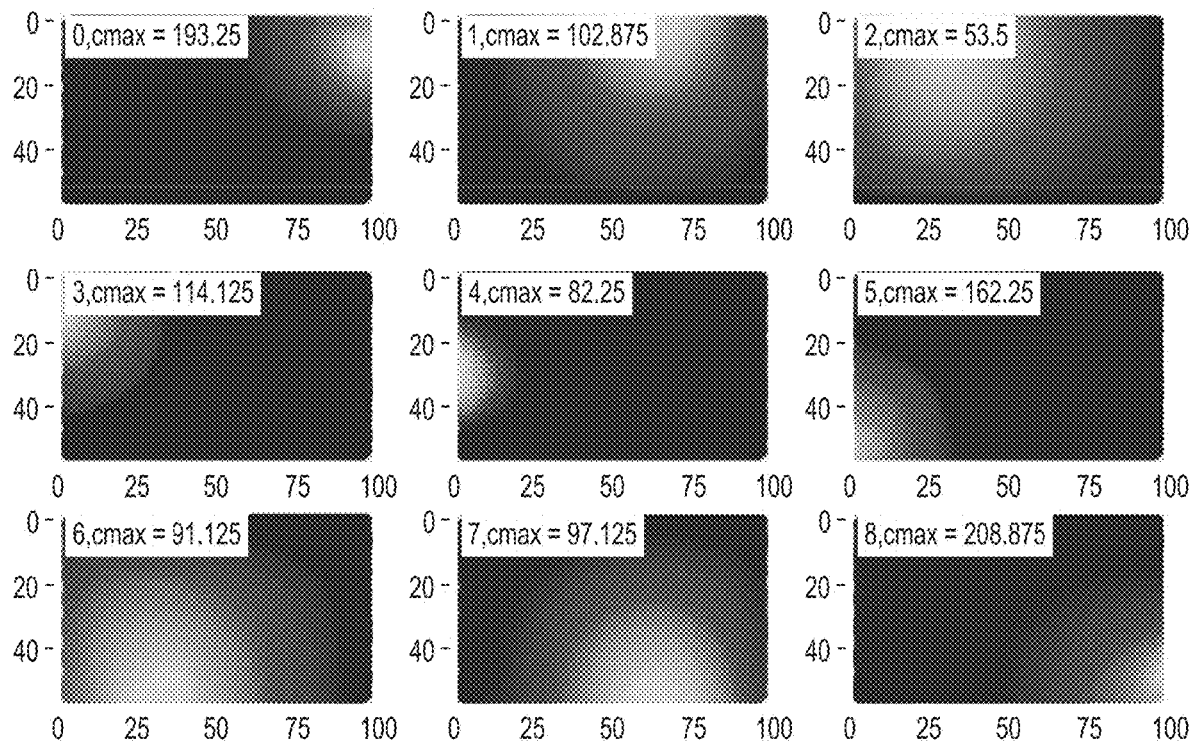

Generally, as the calibration system depresses the probe against the touch sensor surface at the target selection force during the calibration routine, the touch sensor can: serially drive the drive electrodes in the sensor array; read sensor values (e.g., resistances, voltages) from the set of sense electrodes in the sensor array; convert these sensor values into force magnitudes carried by corresponding drive electrode and sense electrode pairs during the scan cycle (e.g., based on a stored common force model that defines a relationship between sense electrode voltage and applied force for each sense electrode in the sensor array); store these force magnitudes in a touch image representing the entire touch sensor surface during the scan cycle; and repeat this process for each subsequence scan cycle during the calibration routine in Block S110, as shown in FIGS. 1 and 4A.

Figure 4B:
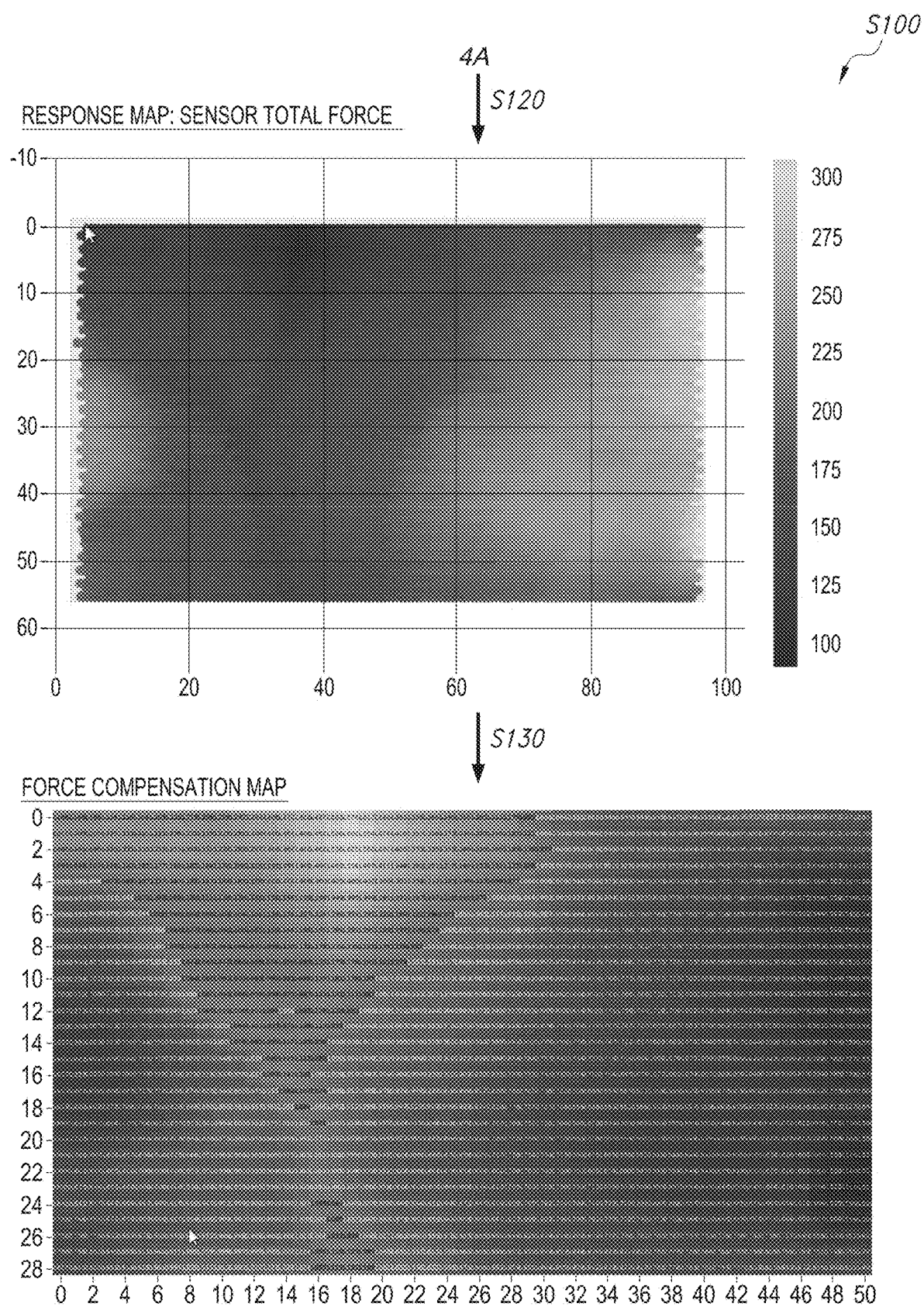

In Block S120, the touch sensor then compiles these touch images into a response map that represents force magnitudes detected on the touch sensor surface responsive to application of the target selection force across the touch sensor surface, as shown in FIGS. 1 and 4B.

In one implementation, during a scan cycle within the calibration routine, the touch sensor generates a touch image containing an array of pixels containing sensor values read from the array of drive electrode and sense electrode pairs during the scan cycle and representing force magnitudes carried by the array of drive electrode and sense electrode pairs during a scan cycle. The touch sensor then: detects an input on the touch sensor surface during this scan cycle based on a cluster of pixels in the touch image that contain values deviating from baseline values stored for corresponding drive electrode and sense electrode pairs in the sensor array (e.g., baseline voltage or resistance values that represent absence of a localized input applied to the touch sensor surface over these drive electrode and sense electrode pairs); calculates a center of the input at the spatial center, the spatial centroid, or the peak-force pixel in this cluster of pixels; calculates an uncorrected total force magnitude of the input on the touch sensor surface during this scan cycle based on a combination (e.g., a sum) of sensor values contained in this cluster of pixels; and stores the uncorrected total force magnitude in a pixel—in the response map—representing a location on the touch sensor surface nearest the detected center of the input. The touch sensor then repeats this process for each other scan cycle completed during the calibration routine to populate the response map with a set of pixels containing total force magnitudes detected at corresponding locations across the touch sensor surface responsive to application to the target selection force on the touch sensor surface at these locations.

1.4.1 Force Compensation Map

Block S130 of the first method S100 recites generating a force compensation map defining threshold forces for detecting selections at the target selection force on the touch sensor surface based on the response map. Generally, in Block S130, the touch sensor can: interpret force magnitudes (or representative values, such as sense electrode voltage or force-sensitive layer contact resistance) detected by drive electrode and sense electrode pairs in the sensor array that correspond to application of the target selection force at corresponding (e.g., adjacent, cospatial) locations on the touch sensor surface; and store these force magnitudes as threshold forces for detecting inputs at the target selection force at corresponding locations across the touch sensor surface, as shown in FIGS. 1 and 4B.

For example, the touch sensor can: implement a common, fixed force model to transform resistance or voltage values read from the drive electrode and sense electrode pairs during scan cycles, within the calibration routine, into force magnitudes carried into these drive electrode and sense electrode pairs during these scan cycles; store these force magnitudes in touch images; compile these force-based touch images into a force-based response map; and directly store this force-based response map as the force compensation map in Block S130 such that the force compensation map defines uncorrected force magnitudes that correspond to application of the target selection force at discrete locations across the touch sensor surface.

Alternatively, the touch sensor can: calculate a force offset, a scalar (i.e., linear) force correction function, or a nonlinear force correction function to convert the detected force magnitude of an input at a location on the touch sensor surface to a calibrated (or "true") force magnitude based on the response map; write this force offset, scalar (i.e., linear) force correction function, or a nonlinear force correction function to a corresponding pixel or region of the force compensation map; and repeat this process for other pixels or regions represented in the response map, as described below.

In a similar example, during a scan cycle, the touch sensor can: drive a set of drive electrodes in the touch sensor to a reference voltage; read a set of sense voltages from a set of sense electrodes in the touch sensor, wherein each sense electrode passes a voltage proportional to the reference voltage and a local contact resistance of the force-sensitive layer against the sense electrode, and wherein the force-sensitive layer exhibits changes in local contact resistance against the sense electrode as a function of force applied to the touch sensor surface; and then compile the set of sense voltages into a touch image for the scan cycle. In this example, the touch sensor can then represent magnitudes of voltages passed by the set of sense electrodes—responsive to application of the target selection force on the touch sensor surface by the probe during the calibration routine—in pixels representing corresponding drive electrode and sense electrode pairs in a response map. The touch sensor can then generate a force compensation map that defines magnitudes of voltages—carried over from the response map—as threshold voltages for detecting inputs of force magnitudes greater than the target selection at corresponding locations on the touch sensor surface. More specifically, in this example, the touch sensor can: generate a voltage-based response map; and directly store this voltage-based response map as the force compensation map in Block S130 such that the force compensation map defines uncorrected voltage magnitudes that correspond to application of the target selection force at discrete locations across the touch sensor surface.

Alternatively, the touch sensor can: calculate a voltage offset, a scalar (i.e., linear) voltage correction function, or a nonlinear voltage correction function to convert the detected voltage of an input at a location on the touch sensor surface to a calibrated (or "true") voltage based on the response map; write this voltage offset, scalar (i.e., linear) voltage correction function, or nonlinear voltage correction function to a corresponding pixel or region of the force compensation map; and repeat this process for other pixels or regions represented in the response map, as described below.

(Additionally or alternatively, the touch sensor can: store these voltage offsets, scalar (i.e., linear) voltage correction functions, or nonlinear voltage correction functions in a point cloud or other, more compact data container; and recall all or parts of this point cloud other data container to correct force magnitudes of inputs on the touch sensor surface during operation.)

1.4.2 Interpolation

In one variation in which the calibration path defines parallel calibration path segments offset by greater than a pitch offset between adjacent rows (or columns) of drive electrode and sense electrode pairs, the touch sensor may capture touch images—during the calibration routine—that represent detected force magnitudes at fewer than all drive electrode and sense electrode pairs in the touch sensor. Therefore, the touch sensor can: execute the foregoing methods and techniques to calculate an uncorrected total force magnitude at a subset of drive electrode and sense electrode pairs when the calibration system drives the probe to the target selection force over (or very near) this subset of drive electrode and sense electrode pairs; and then interpolate uncorrected total force magnitudes between this subset of drive electrode and sense electrode pairs to predict total force magnitude that the touch sensor may detect at the remaining drive electrode and sense electrode pairs responsive to application of the target selection force on the touch sensor surface over (or very near) these other drive electrode and sense electrode pairs, as shown in FIGS. 1, 4A, and 4B.

In one example, the calibration system draws the probe along a continuous boustrophedonic (e.g., serpentine) path across the touch sensor surface during the calibration routine. The touch sensor then initializes a sparse response map and implements methods and techniques described above to: detect an input—on the touch sensor surface—represented in a set of pixels in a first touch image captured during a scan cycle during the calibration routine; calculate a location of the input based on the set of pixels in the first touch image (e.g., a centroid of the set of pixels, a location of pixel in the cluster of pixels containing a peak force); calculate an uncorrected total force magnitude of the input based on a combination of values contained in the set of pixels; and store the uncorrected total force magnitude in a first pixel in the sparse response map nearest the location of the input. The touch sensor repeats this process for other touch images captured by the touch sensor during the calibration routine.

In this example, the touch sensor then interpolates between the uncorrected total force magnitudes represented in pixels in the sparse response map to generate a dense response map representing predicted total force magnitudes of inputs—at the target selection force—applied to locations on the touch sensor surface between segments of the boustrophedonic path.

The touch sensor can then implement methods and techniques described above to store these uncorrected total force magnitudes and these predicted total force magnitudes contained in pixels in the dense response map as threshold forces—for detecting inputs of force magnitudes greater than the target selection force at corresponding locations on the touch sensor surface—in the force compensation map.

1.4.3 Local Calibration

In the foregoing implementation, the touch sensor can locally execute the foregoing process to locally generate the force compensation map based on: touch images captured during the calibration routine; and the target selection force, such as preloaded in memory at the touch sensor or received from the calibration system during the calibration routine.

For example, the touch sensor can: initiate the calibration routine in response to receipt of a calibration command from the calibration system; download a magnitude of the target selection force from the calibration system, such as over a wired or wireless connection; implement methods and techniques described above to locally generate the force compensation map based on the response map and the magnitude of the target selection force; and then store the force compensation map in local memory.

Conversely, the touch sensor can capture touch images during the calibration routine and then upload these touch images to the calibration system (or other local or remote computer system). The calibration system (or other local or remote computer system) can then implement methods and techniques described above to generate the force compensation map for the touch sensor and then download the force compensation map to the touch sensor, which then stores this force compensation map in local memory.

1.4.4 Operation with Corrected Selection Threshold

The first method S100 further includes: capturing a first touch image representing magnitudes of forces detected on the touch sensor surface in Block S140; based on the first touch image, detecting a first input at a first location on the touch sensor surface in Block S142 and detecting a first force magnitude of the first input in Block S144; and, in response the first force magnitude exceeding a first threshold force assigned to the first location by the force compensation map, registering a first selection at the first location on the touch sensor surface in Block S146. Generally, in Block S140, S142, S144, and S146, the touch sensor can: detect inputs on the touch sensor surface; derive uncorrected force magnitudes of these inputs; correct the force magnitudes of these inputs based on the force compensation map in order to identify inputs of force magnitudes exceeding the target selection force; and selectively respond to these "click" inputs accordingly, as shown in FIG. 1.

In one implementation, the touch sensor: sequentially drives each column of drive electrodes in the sensor array to a reference; sequentially reads a set of voltages from corresponding rows of sense electrodes in the sensor array; and transforms the set of voltages into a force image—that represents force magnitudes applied across the touch sensor surface and carried into each drive electrode and sense electrode pair in the sensor array during a scan cycle—based on a common, fixed force model for all drive electrode and sense electrode pairs in the sensor array.

In this implementation, the touch sensor can then: detect a first input on the touch sensor surface during this scan cycle based on a first cluster of pixels in the first touch image containing values (e.g., force magnitudes) that deviate from corresponding baseline values (e.g., null force magnitudes); and calculate a first location of the first input based on the first cluster of pixels, such as at a spatial center or centroid of the first cluster of pixels or at a location corresponding to a peak force represented in the first cluster of pixels. Furthermore, the touch sensor can: calculate a first uncorrected force magnitude of the first input based on a combination (e.g., a sum) of values (e.g., force magnitudes) contained in the first cluster of pixels; query the force compensation map for a first threshold value (e.g., a threshold uncorrected force magnitude) assigned to the first location; and compare the first uncorrected force magnitude of the first input to the first threshold value. Thus, if the first uncorrected force magnitude of the first input is less than the first threshold value, the touch sensor can confirm that the force magnitude of the first input is less than the target selection force. However, if the first uncorrected force magnitude of the first input equals or exceeds the first threshold value, the touch sensor can: confirm that the force magnitude of the first input meets or exceeds the target selection force; register a first selection (or a "click" input) at the first location on the touch sensor surface; and then execute a haptic feedback cycle, such as by actuating a vibrator to vibrate the touch sensor surface and/or triggering an audio driver to output an audible "click" sound.

In a similar implementation, the touch sensor: sequentially drives each column of drive electrodes in the sensor array to a reference; sequentially reads a set of voltages from corresponding rows of sense electrodes in the sensor array; and stores these voltages in a sequence of touch images.

In this implementation, the touch sensor can then: detect a first input on the touch sensor surface during this scan cycle based on a first cluster of pixels in the first touch image containing voltage values that deviate from corresponding baseline voltage values; and calculate a first location of the first input based on the first cluster of pixels, such as at a spatial center or centroid of the first cluster of pixels or at a location corresponding to a peak voltage value represented in the first cluster of pixels. Furthermore, the touch sensor can: calculate a first uncorrected voltage total for the first input based on a combination (e.g., a sum) of voltage values contained in the first cluster of pixels; query the force compensation map for a first threshold voltage total assigned to the first location; and compare the first uncorrected voltage value of the first input to the first voltage total. Thus, if the first uncorrected voltage total for the first input is less than the first threshold voltage total, the touch sensor can confirm that the force magnitude of the first input is less than the target selection force. However, if the first uncorrected voltage total of the first input equals or exceeds the first threshold voltage total, the touch sensor can: confirm that the force magnitude of the first input meets or exceeds the target selection force; register a first selection (or a "click" input) at the first location on the touch sensor surface; and then execute a haptic feedback cycle, such as by actuating a vibrator to vibrate the touch sensor surface and/or triggering an audio driver to output an audible "click" sound.

1.4.5 Multiple Corrected Selection Thresholds

In one variation, the calibration system drives the probe across the touch sensor surface at multiple target forces during a calibration routine, and the touch sensor (or the calibration system, etc.) generates a force compensation map that defines one uncorrected force magnitude for each target force at each input location (e.g., over each drive electrode and sense electrode pair) on the touch sensor surface.

For example, the calibration system can execute the foregoing methods and techniques to drive the probe against the touch sensor surface at a first target selection force (e.g., 1.68 Newtons for a "single-click," "light-click," or "left-click" input) and to sweep the probe across the touch sensor surface (e.g., along the preplanned calibration path) during a first segment of the calibration routine. The touch sensor can implement methods and techniques described above to: capture a first set of touch images during this first segment of the calibration routine; generate a first response map based on this first set of touch images; and populate the force compensation map with a first set of uncorrected force magnitudes—carried over from the first response map—that correspond to application of the first target selection force at discrete locations across the touch sensor surface.

In this example, the calibration system can repeat this process to drive the probe against the touch sensor surface at a second target selection force (e.g., 2.29 Newtons for a "double-click," "deep-click," or "right click" input) and to sweep the probe across the touch sensor surface (e.g., along the preplanned calibration path) during a second segment of the calibration routine. The touch sensor can implement methods and techniques described above to: capture a second set of touch images during this second segment of the calibration routine; generate a second response map based on this second set of touch images; and populate the force compensation map with a second set of uncorrected force magnitudes—carried over from the second response map—that correspond to application of the second target selection force at discrete locations across the touch sensor surface.

Later, during operation, the touch sensor can implement methods and techniques described above to: drive and scan the drive electrode and sense electrode pairs; generate a touch image based on values read from the sense electrodes; and detect an input on the touch sensor surface at a first location and of a first uncorrected force magnitude based on values contained in the touch image. Accordingly, the touch sensor can query the force compensation map for a first threshold value (e.g., a threshold uncorrected force magnitude) corresponding to the first target selection force and a second threshold value corresponding to the second target selection force assigned to the first location. If the first uncorrected force magnitude of the first input is less than the first threshold value, the touch sensor can confirm that the force magnitude of the first input is less than the first and second target selection forces. However, if the first uncorrected force magnitude of the first input equals or exceeds the first threshold value but is less than the second threshold value, the touch sensor can: confirm that the first input is of a first input type associated with the first target selection force (e.g., a "single-click," "light-click," or "left-click" input type); register the first input type at the first location on the touch sensor surface; and then execute a first haptic feedback cycle for the first input type, such as by actuating a vibrator to vibrate the touch sensor surface at a first amplitude over a first time duration. Furthermore, if the first uncorrected force magnitude of the first input equals or exceeds the second threshold value, the touch sensor can: confirm that the first input is of a second input type associated with the second target selection force (e.g., a "double-click," "deep-click," or "right-click" input type); register the first input type at the first location on the touch sensor surface; and then execute a second haptic feedback cycle for the second input type, such as by actuating the vibrator to vibrate the touch sensor surface at a second amplitude greater than the first amplitude and/or over a second time duration greater than the first time duration.

1.5 Offset Function

In one variation shown in FIG. 2, rather than populate the force compensation map with threshold values for detecting inputs—of force magnitudes greater than the target selection force—on the touch sensor surface based on the values contained in the response map, the touch sensor can populate the force compensation map with values that represent force offsets between: the uncorrected force magnitudes of inputs detected at discrete locations on the touch sensor surface during the calibration routine; and the known force magnitudes of inputs applied to these discrete locations by the calibration system during the calibration routine (e.g., the target selection force).

In one implementation, the touch sensor executes methods and techniques described above to: capture a touch image during the calibration routine; detect the location and uncorrected total force magnitude of an input on the touch sensor surface during this scan cycle based on values contained in this touch image; repeat this process during subsequent scan cycle during the calibration routine; and assemble the locations and uncorrected total force magnitudes of these inputs into a response map. Then, for each pixel in the response map, the touch sensor can: calculate a force offset between the target selection force applied to the touch sensor surface over this drive electrode and sense electrode pair in the sensor array during the calibration routine and the uncorrected total force magnitude stored in this pixel; and write this force offset (e.g., an "offset correct function") to a corresponding position in the force compensation map. Then, during operation, the touch sensor can implement methods and techniques described above to execute a scan cycle and generate a touch image representing uncorrected force magnitudes detected across the touch sensor surface during the scan cycle. The touch sensor can then: sum the touch image and the force compensation map to generate a corrected touch image containing normalized (or "corrected") force magnitudes across the touch sensor surface; detect a first input on the touch sensor surface based on values contained in a first cluster of pixels in the corrected touch image; calculated a corrected force magnitude of the first input based on a combination of values contained in the first cluster of pixels in the corrected touch image; calculate a centroid of the first input, at a first location on the touch sensor surface, based on the first cluster of pixels; and then register a selection input at the first location in response to the corrected force magnitude exceeding the target selection force.

1.5.1 Ground Truth Applied Force

In this variation, the calibration system can also: track a sequence of force magnitudes applied to the touch sensor surface by the probe during the calibration routine; and generate a ground truth input map representing the sequence of force magnitudes—that is, the "true" force magnitudes applied at known locations across the touch sensor surface during the calibration routine, which may deviate from the target selection force (e.g., by as much as 1%, 5%).

Accordingly, the touch sensor can execute methods and techniques described above to: capture a touch image during the calibration routine; detect the location and uncorrected total force magnitude of an input on the touch sensor surface during this scan cycle based on values contained in this touch image; repeat this process during subsequent scan cycle during the calibration routine; and assemble the locations and uncorrected total force magnitudes of these inputs into a response map. Then, for each pixel in the response map, the touch sensor can: extract a true force magnitude—applied to a location on touch sensor surface corresponding to this pixel—from the ground truth input map; calculate a force offset between the true force magnitude and the uncorrected total force magnitude stored in this pixel; and write this force offset (e.g., an "offset correct function") to a corresponding position in the force compensation map.

1.5.1.1 Alignment

In this variation, the calibration system and the touch sensor can also cooperate to align the ground truth input map and the response map before fusing this into the force compensation map.

In one implementation, during an alignment routine before or after the calibration routine, the calibration system applies the probe to a set of target alignment locations—offset according to an alignment constellation within a calibration system coordinate system—on the touch sensor surface. During this alignment routine, the touch sensor captures a set of alignment images that represent a set of detected alignment locations detected on the touch sensor surface within a touch sensor coordinate system. The touch sensor (or the calibration system, the remote computer system) can then: calculate a transform that projects the set of target alignment locations in the calibration system coordinate system onto the set of detected alignment locations in the touch sensor coordinate system; apply the transform to the ground truth input map to generate an aligned ground truth input map; and then generate the force compensation map based on differences between magnitudes of forces represented in the response map and cospatial force magnitudes represented in the aligned ground truth input map.

1.5.2 Interpolation

As described above, the calibration system can execute a calibration path that traverses only a subset of the drive electrode and sense electrode pairs in the sensor array. Accordingly, the touch sensor can implement the foregoing methods and techniques to calculate a sparse force compensation map that contains force offsets calculated for this subset of drive electrode and sense electrode pairs based on touch images captured during the calibration routine. The touch sensor can then: interpolate between these force offsets to derive force offsets for the remaining drive electrode and sense electrode pairs in sensor array; and compile these derived and interpolated force offsets into one complete (or "dense") force compensation map.

1.6 Scalar Correction Function

In another variation shown in FIG. 3, rather than populate the force compensation map with threshold values for detecting inputs of force magnitudes greater than the target selection force on the touch sensor surface or force offset values, the touch sensor can populate the force compensation map with scalar values (or "scalar coefficients") that scale: uncorrected force magnitudes of inputs detected at discrete locations on the touch sensor surface during the calibration routine; to the known force magnitudes of inputs applied to these discrete locations by the calibration system during the calibration routine (e.g., a reference force that may differ from a target selection force described above).

In one implementation, the touch sensor executes methods and techniques described above to generate a response map based on touch images captured during the calibration routine. Then, for each pixel in the response map, the touch sensor can: calculate a scalar coefficient based on (e.g., equal to) a ratio of the reference force to the uncorrected total force magnitude stored in the pixel; and store this scalar coefficient (i.e., a scalar correction function) in a corresponding position (e.g., pixel) in the force compensation map.

Then, during operation, the touch sensor can implement methods and techniques described above to execute a scan cycle and generate a touch image representing uncorrected force magnitudes detected across the touch sensor surface during the scan cycle. The touch sensor can then: multiply a first force magnitude represented at a first location in the touch image by a first scalar coefficient stored in a corresponding first position in the force compensation map to calculate a corrected first force magnitude for the first location; write this first force magnitude to a force-corrected touch image; and repeat this process for each other force magnitude represented in the touch image in order to complete the force-corrected touch image. The touch sensor can then implement methods and techniques described above to detect an input in the force-corrected touch image; calculate a corrected total force magnitude of the input based on corrected force magnitudes contained in the force-corrected touch image; and then register the input as a "click" input if the corrected total force magnitude of the input exceeds the target selection force.

Furthermore, in this implementation, the touch sensor can selectively apply scalar coefficients stored in the force compensation map to calculate corrected force magnitudes of inputs across the touch sensor surface. In particular, because the force compensation map was originally generated according to a particular calibration force applied by the calibration system during the calibration routine, the touch sensor can: apply greater weight to a scalar coefficient—stored in the force compensation map and corresponding to a particular location on the touch sensor surface—as the force magnitude of an input applied to the touch sensor surface at the particular location approaches the calibration force; and vice versa in order to avoid introducing artifacts in detected force magnitudes at force magnitudes that are much less and much greater than the calibration force. For example, during the foregoing scan cycle, the touch sensor can: extract the first force magnitude from the first location in the (uncorrected) touch image; calculate an uncorrected weight value proportional to a difference between the first force magnitude and the calibration force applied to the touch sensor surface by the calibration system during the calibration routine; calculate an corrected weight value inversely proportional to the difference between the first force magnitude and the calibration force; calculate a combination of [the first force magnitude multiplied by the uncorrected weight value] and [the first force magnitude multiplied by the corrected weight value and the first scalar coefficient]; and store this combination at the total correct force at the first location in the force-corrected touch image. Alternatively, during operation, the touch sensor can implement methods and techniques described above to: generate a touch image representing uncorrected force magnitudes detected across the touch sensor surface during a scan cycle; detect a location of the input based on this touch image; and calculate an uncorrected total force magnitude of this input based on the touch image. The touch sensor can then: retrieve a first scalar coefficient from a first position—corresponding to the first location—in the force compensation map; multiply the uncorrected total force magnitude of the input by the first scalar coefficient to calculate a corrected total force magnitude of the input; and then register a selection input at the first location in response to the corrected total force magnitude exceeding the target selection force.

1.6.1 Ground Truth Applied Force

In this variation, the calibration system can also implement methods and techniques described above to generate a ground truth input map representing "true" force magnitudes applied at known locations across the touch sensor surface during the calibration routine.

Accordingly, the touch sensor can implement methods and techniques similar to those described above to generate a response map based on touch images captured during the calibration routine. The touch sensor can then: extract a first true force magnitude applied to a first location on the touch sensor surface during the calibration routine; calculate a first scalar coefficient based on (e.g., equal to) a first ratio of the first true force magnitude to a first uncorrected total force magnitude stored in a first pixel in the response map; write this first scalar coefficient to a first position (e.g., a first pixel) in the force compensation map; and repeat this process for each other pixel contained in the response map to complete the force compensation map based on the "true" force magnitudes applied to the touch sensor surface during the calibration routine.

1.6.2 Interpolation

As described above, the calibration system can execute a calibration path that traverses only a subset of the drive electrode and sense electrode pairs in the sensor array. Accordingly, the touch sensor can implement the foregoing methods and techniques to calculate a sparse force compensation map that contains scalar coefficients calculated for this subset of drive electrode and sense electrode pairs based on touch images captured during the calibration routine. The touch sensor can then: interpolate between these scalar coefficients to derive scalar coefficients for the remaining drive electrode and sense electrode pairs in sensor array; and compile these derived and interpolated scalar coefficients into one complete (or "dense") force compensation map.

1.7 Nonlinear Correction Function

In another variation, the calibration system applies multiple calibrated reference forces to locations across the touch sensor surface during the calibration routine; and the touch sensor (or the calibration system, the remote computer system) generates nonlinear correction functions that map uncorrected force magnitudes interpreted from data read from the sensor array to corrected (or "calibrated") force magnitudes across a range of force magnitudes.

In one implementation, the calibration system implements methods and techniques described above to drive the probe against the touch sensor surface at a first reference force (e.g., 0.1 Newtons) and to sweep the probe across the touch sensor surface during a first segment of the calibration routine. The touch sensor can implement methods and techniques described above to: capture a first set of touch images during this first segment of the calibration routine; and generate a first response map based on this first set of touch images. The touch sensor can: calculate a first coefficient based on a ratio of the first reference force to a first uncorrected total force magnitude stored in a first pixel in the first response map; and repeat this process for each other pixel in the first response map to generate a first matrix of first coefficients for the sensor array. The calibration system can then drive the probe against the touch sensor surface at a second reference force (e.g., 2.0 Newtons) and sweep the probe across the touch sensor surface during a second segment of the calibration routine. Accordingly, the touch sensor can: capture a second set of touch images during this second segment of the calibration routine; and generate a second response map based on this second set of touch images. The touch sensor can then: calculate a second coefficient based on a ratio of the second reference force to a second uncorrected total force magnitude stored in a first pixel in the second response map; and repeat this process for each other pixel in the second response map to generate a second matrix of second coefficients for the sensor array. The touch sensor (or the calibration system, the remote computer system) can then: combine the first coefficient at a first position in the first matrix and the second coefficient at the first position in the second matrix to generate a first nonlinear correction function for a first location on the touch sensor surface; write this first nonlinear correction function to a first position in the force compensation map; and then repeat this process for each other position in the first and second matrices to complete the force compensation map.

In another implementation, the calibration system: drives the probe against the touch sensor surface at a first reference force during a first segment of the calibration routine; and drives the probe against the touch sensor surface at a second reference force during a second segment of the calibration routine. Accordingly, the touch sensor implement methods and techniques described above to: capture a first set of touch images during the first segment of the calibration routine; generate a first response map based on this first set of touch images; capture a second set of touch images during the second segment of the calibration routine; and generate a second response map based on this second set of touch images. The touch sensor (or the calibration system, the remote computer system) then: extracts a first uncorrected force magnitude from a first position in the first response map; pairs the first uncorrected force with the first reference force to define a first reference point; extracts a second uncorrected force magnitude from a second position in the second response map; pairs the second uncorrected force with the second reference force to define a second reference point; generates a baseline reference point containing a null reference force and a baseline force read from a first sense electrode (or first cluster of sense electrodes) adjacent a first location on the touch sensor surface when no input is applied to the touch sensor surface; implement regression techniques to calculate a first best-fit function (e.g., a quadratic function) that intersects the first, second, and baseline reference points and thus represents a relationship between uncorrected force magnitudes detected at the first location and the true force magnitude applied to the first location over a range of applied force magnitudes; and stores the first best-fit function at a first position in the force compensation map. The touch sensor can then repeat this process for each other pixel location contained in the first and second response maps to complete the force compensation map.

In this variation, the calibration system can also sweep the probe across the touch sensor surface at additional reference forces, and the touch sensor (or the calibration system, the remote computer system) can implement similar methods and techniques to generate nonlinear correction functions based on additional reference forces and corresponding uncorrected force magnitudes detected on the touch sensor surface during the calibration routine.

Then, during operation, the touch sensor can implement methods and techniques described above to: generate a touch image representing uncorrected force magnitudes detected across the touch sensor surface during a scan cycle; detect a location of the input based on this touch image; and calculate an uncorrected total force magnitude of this input based on the touch image. The touch sensor can then: retrieve a first nonlinear correction function from a first position—corresponding to the first location—in the force compensation map; and insert the uncorrected total force magnitude of the input into the nonlinear correction function to calculate a corrected total force magnitude of the input. The touch sensor can also register a selection input at the first location in response to the corrected total force magnitude exceeding a predefined target selection force (which may differ from the first and second reference forces described above).

1.7.1 Interpolation

As described above, the calibration system can execute a calibration path that traverses only a subset of the drive electrode and sense electrode pairs in the sensor array. Accordingly, the touch sensor can implement the foregoing methods and techniques to calculate a sparse force compensation map that contains nonlinear correction functions calculated for this subset of drive electrode and sense electrode pairs based on touch images captured during the calibration routine. The touch sensor can then: interpolate between these nonlinear correction functions to derive nonlinear correction functions for the remaining drive electrode and sense electrode pairs in sensor array; and compile these derived and interpolated nonlinear correction functions into one complete (or "dense") force compensation map.

1.8 Multiple Calibration Routines For Different Input Types

In one variation, the calibration system: selects (or "loads") a first probe of a first input type (e.g., a soft silicone depressor defining a geometry approximating an adult human index finger); depresses the first probe against the touch sensor surface at a first target selection force associated with the first input type (e.g., 1.68 Newtons for finger-based selection inputs; and sweeps the first probe across the touch sensor surface during a first segment of the calibration routine. The touch sensor: captures a first set of touch images during the first segment of the calibration routine; and generates a first force compensation map for the first input type, as described above.

The calibration system then: selects a second probe of a second input type (e.g., a rigid silicone depressor including a tapered tip geometry approximating a writing stylus); depresses the second probe against the touch sensor surface at a second target selection force associated with the second input type (e.g., 2.04 Newtons for stylus-based selection inputs; and sweeps the second probe across the touch sensor surface during a second segment of the calibration routine. The touch sensor: captures a second set of touch images during the second segment of the calibration routine; and generates a second force compensation map for the second input type, as described above.

Then, during operation, the touch sensor: scans the drive electrode and sense electrode pairs in the sensor array during a scan cycle; captures a touch image during the scan cycle; detects a first input on the touch sensor surface during the scan cycle based on a cluster of pixels—in the touch image—that contain force (or voltage, resistance) values that differ from baseline values stored for the corresponding drive electrode and sense electrode pairs; and derives a first location and an area of the input from the cluster of pixels. The touch sensor can also: calculate a size characteristic (e.g., a diameter, a maximum width, a ratio of maximum width to minimum width) based on the area of the input; retrieve a first range of size characteristics common to the first input type (e.g., a stored range of diameters, maximum widths, or ratios of maximum width to minimum width common to adult human index finger); retrieve a second range of size characteristics common to the second input type (e.g., a stored range of diameters, maximum widths, or ratios of maximum width to minimum width common to writing styluses); and identify the input as one of the first and second input types based on proximity of the size characteristic of the input to the range of size characteristics common to the first and second input types.

Additionally or alternatively, the touch sensor can: derive a force profile characteristic (e.g., a peak force, a force slope from the perimeter of the input to the center or peak force within the input area, a ratio of minimum to maximum forces within the input) based on the area of the input; retrieve a first range of force profile characteristics common to the first input type (e.g., a stored range of peak forces, force slopes across input areas, or ratios of minimum to maximum forces within input areas common to adult human index finger); retrieve a second range of size characteristics common to the second input type (e.g., a stored range of peak forces, force slopes across input areas, or ratios of minimum to maximum forces within input areas common to writing styluses); and identify the input as one of the first and second input types based on proximity of the force profile characteristic of the input to the range of force profile characteristics common to the first and second input types.

Accordingly, in response to identifying the input as of the first input type or exhibiting size and/or force profile characteristics more similar to the first input type, the touch sensor can: load the first force compensation map; implement methods and techniques described above to calculate a corrected total force magnitude of the input based on the set of pixels and the first force compensation map; and register the input as a selection input of the first input type at the first location on the touch sensor surface based on uncorrected force magnitudes contained in the set of pixels, the first force compensation map, and the first target selection force assigned to the first input type. Similarly, in response to identifying the input as of the second input type or exhibiting size characteristics more similar to the second input type, the touch sensor can: load the second force compensation map; implement methods and techniques described above to calculate a corrected total force magnitude of the input based on the set of pixels and the second force compensation map; and register the input as a selection input of the second input type at the first location on the touch sensor surface based on uncorrected force magnitudes contained in the set of pixels, the second force compensation map, and the second target selection force assigned to the second input type.

Therefore, in this implementation, the calibration system and the touch sensor can cooperate to calibrate force compensation maps to different input types that exhibit different spatial characteristics and/or force distribution profiles on the touch sensor surface. The touch sensor can then selectively apply these force compensation maps based on spatial characteristics and/or force distribution profiles of inputs detected on the touch sensor surface during operation.

1.9 Deflection Spacers

Figure 6:
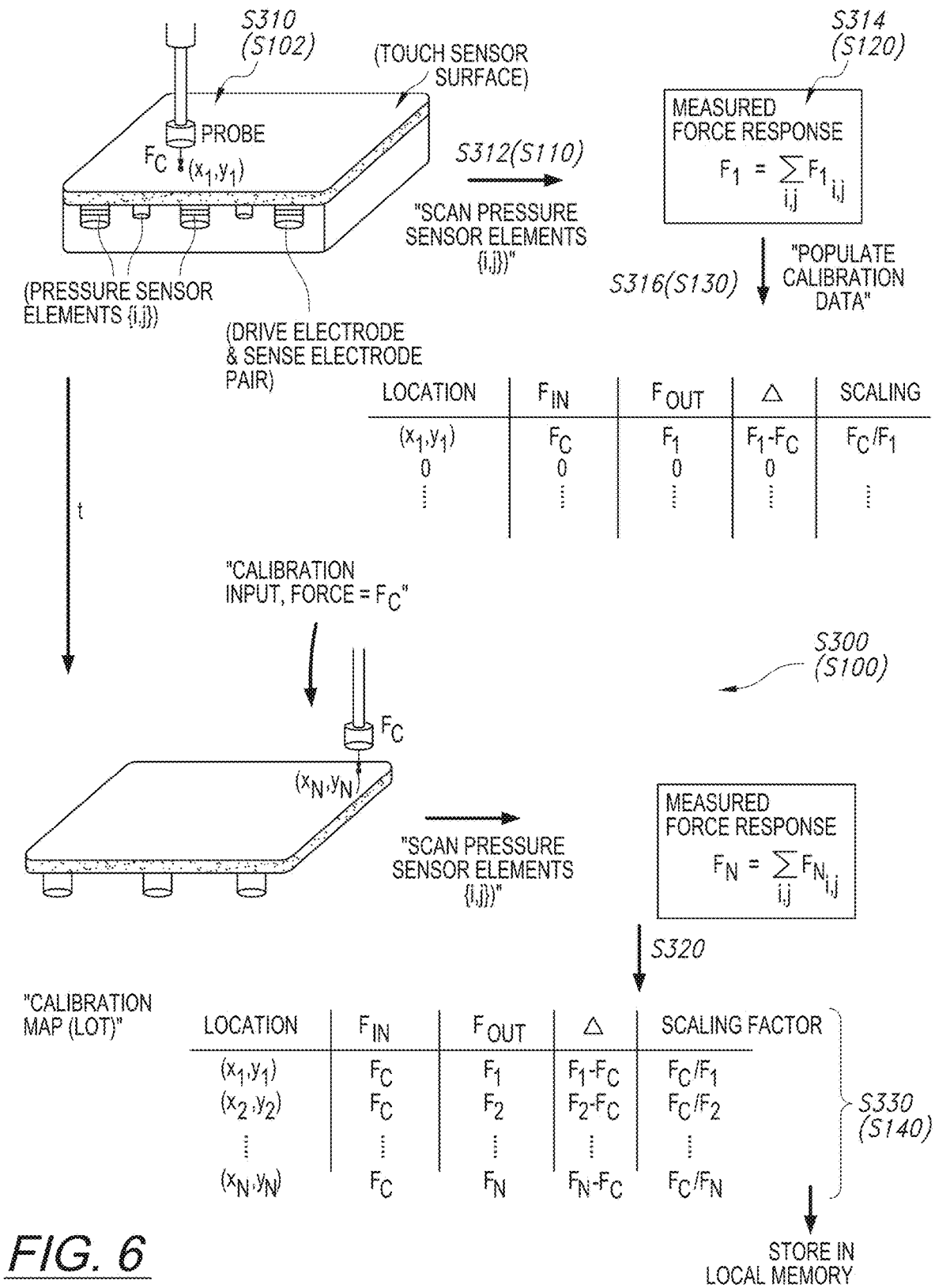
FIG. 6 is a flowchart representation of a third method.

In one variation shown in FIG. 6, the touch sensor includes a controller and an array of discrete (e.g., discontinuous) pressure sensor elements arranged beneath the touch sensor surface, each including: a drive electrode and sense electrode pair (e.g., a pair of interdigitated electrodes) formed on a substrate (e.g., a common PCB that spans the array of discrete pressure sensors); a force-sensitive layer arranged over the drive electrode and sense electrode pair; a deflection spacer (e.g., a silicone pad) or a spring that couples the discrete pressure sensor and the substrate to a chassis of an electronic device.

In this variation, the touch sensor can further include a capacitive touch sensor subsystem arranged across the substrate below the touch sensor surface. Accordingly, during a scan cycle, the controller can: sample the capacitive touch sensor subsystem to detect locations (and input areas, input sizes, input geometries, etc.) of inputs on the touch sensor surface; and sample the discrete pressure sensor elements to detect force magnitudes carried from regions of the touch sensor surface into the chassis.

In one implementation, in this variation: the substrate can define a 3.5-inch by 4.5-inch area; the touch sensor surface can be arranged over a top layer of the substrate to form 3.5-inch by 4.5-inch active input area; each pressure sensor can include a 0.25-inch-diameter force-sensitive layer coupled to a drive electrode and sense electrode pair spanning 0.25-inch-diameter region on a bottom layer of the substrate; and the touch sensor can include ten pressure sensors supporting the perimeter of the substrate on the chassis of the computing device. Thus, when an input is applied to the touch sensor surface, the controller can: detect the location (and input area, input size, input geometry, etc.) of the input on the touch sensor surface based on capacitance values read from the capacitive touch sensor subsystem; and calculate a distribution of the total force magnitude of this input carried by each of the ten pressure sensors from the touch sensor surface into the chassis.

1.9.1 Calibration Routine

In this variation, the calibration system can implement methods and techniques similar to those described above to: depress the probe against the touch sensor surface with a target selection force or other reference force; and then draw the probe across the touch sensor surface during a calibration routine.

During the calibration routine, the touch sensor can: read capacitance values from the capacitive touch sensor subsystem; read values (e.g., voltages, resistances) representing uncorrected force magnitudes from the pressure sensors; fuse these capacitance and pressure sensor data into a touch image representing locations and uncorrected force magnitudes of inputs on the touch sensor during a scan cycle; and repeat this process for subsequent scan cycles during the calibration routine. The touch sensor can then implement methods and techniques described above to compile the touch images into a response map that represents distributions of uncorrected force magnitudes carried by the small number of pressure sensors as a function of application of the target selection force (or reference force) across a large number of locations on the touch sensor surface. The touch sensor can then generate a force compensation map based on this response map, as described above.

For example, the touch sensor can: capture a capacitance image representing a location of the probe applied to the touch sensor surface by the calibration system during a scan cycle within the calibration routine; capture a force image representing a distribution of forces carried by the set of pressure sensors during this scan cycle; calculate an uncorrected total force magnitude of an input at the location on the touch sensor surface based on a combination (e.g., a sum) of forces in the distribution of forces represented in the force image; and generate a touch image based on the capacitance image and the uncorrected total force magnitude, such as by labeling the input represented in the capacitance image with the uncorrected total force magnitude.

Then, for each touch image in this sequence of touch images, the touch sensor can: identify a pixel in the response map that corresponds to a location of the probe—applied to the touch sensor surface by the calibration system during the calibration routine—represented in the touch image; and write the uncorrected total force magnitude from the touch image to this pixel in the response map. The touch sensor can then store uncorrected total force magnitudes contained in pixels in the response map as threshold forces for detecting selection inputs at the target selection force—at corresponding locations on the touch sensor surface—in the force compensation map, as described above.

Alternatively, the touch sensor can implement methods and techniques described above to generate a force compensation map containing offset forces, scalar coefficients, or nonlinear correction functions based on touch images captured during the calibration routine.

The touch sensor can then implement methods and techniques described above to normalize, register, and respond to inputs on the touch sensor surface during operation based on this force compensation map.

2. Second Method

Figure 5:
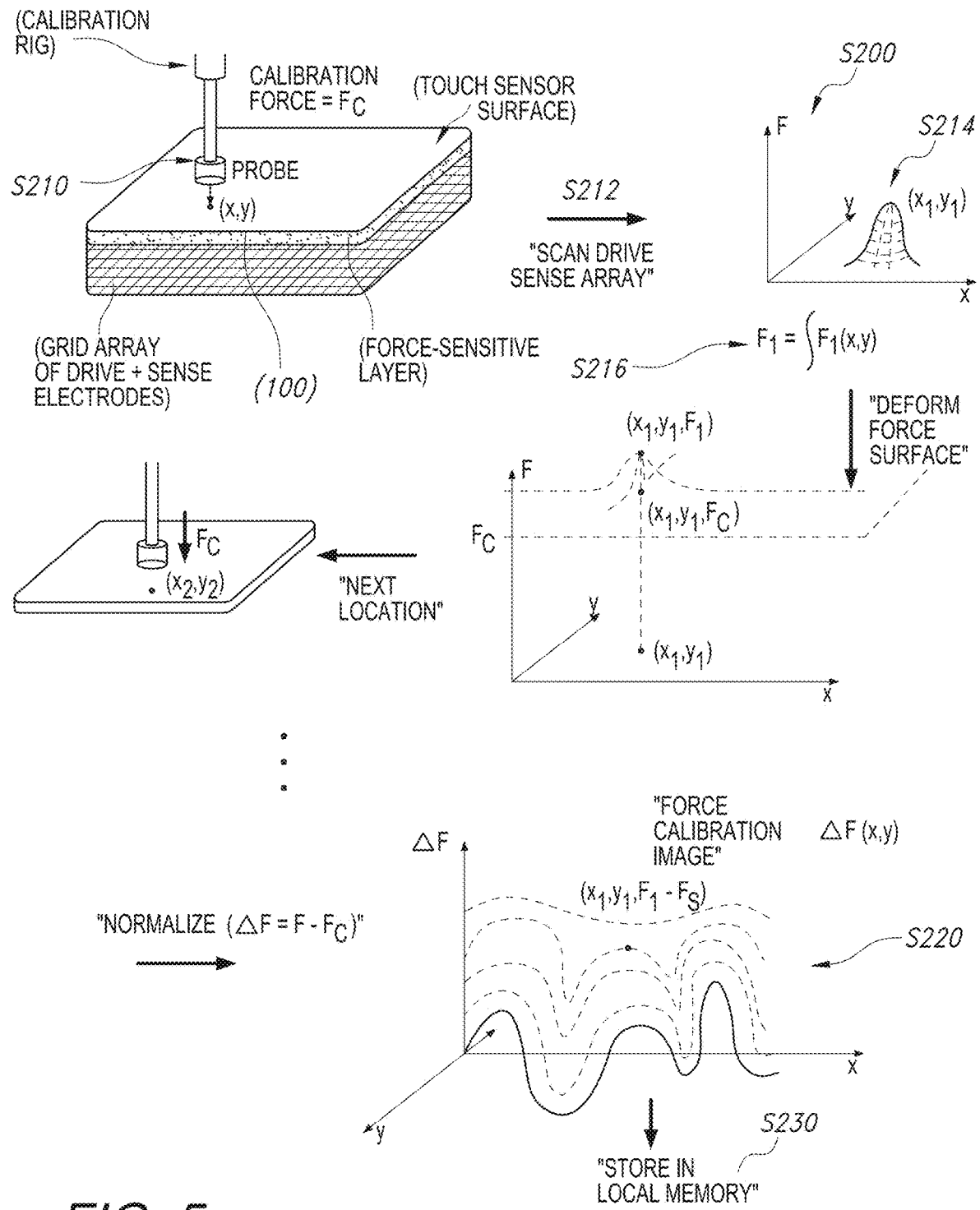
FIG. 5 is a flowchart representation of a second method.

As shown in FIG. 5, a second method S200 for calibrating a touch sensor includes: at each location in a set of locations on a surface of a touch sensor, receiving a calibration force of a predefined magnitude at the location in Block S210; sampling a set of resistance values from an array of drive electrode and sense electrode pairs in the touch sensor in Block S212; transforming the set of resistance values into a force distribution across the surface of the touch sensor in Block S214; calculating a local force response of the touch sensor to the calibration force based on the force distribution and the location in Block S216; generating a normalized force response map representing variations in local force response across the surface of the touch sensor based on the local force response at each location in the set of locations and the magnitude of the calibration force in Block S220; and storing a force compensation map representing an inverse of the normalized force response map in a controller of the touch sensor in Block S230.

2.1 Calibration Routine

Generally, according to the second method S200, the touch sensor is configured to sequentially receive (e.g., experience, undergo) controlled applications of input forces defining a predefined calibration magnitude (or "calibration forces) at a set of discrete locations on the touch sensor surface during a calibration cycle. For example, the calibration system—in cooperation with the touch sensor—can drive the actuation subsystem and the attached probe to apply a sequence of calibration forces over the touch sensor surface. Concurrent with each application of the calibration force, the controller within the touch sensor can: sequentially drive each column of drive electrodes in the array of drive electrode and sense electrode pairs at a reference potential; sequentially sample resistance values between drive electrode and sense electrode pairs at corresponding columns of sense electrodes; transform each resistance value (or change in resistance) into a force magnitude corresponding to the location of each drive electrode and sense electrode pair; and aggregate these force magnitudes into a force image representing a force distribution across the array of drive electrode and sense electrode pairs. In general, the calibration system drives the actuation subsystem at a frequency that is significantly lower than the scan frequency of the touch sensor (e.g., drive the calibration system at 1 Hz but scan the touch sensor at 50 Hz), enabling the touch sensor to generate (e.g., capture) and store a complete force image representing the touch sensor output responsive to each application of the calibration force.

Blocks of the second method S200 further recite: calculating a local force response of the touch sensor to the calibration force based on the force distribution and the location at Block S216. Generally, the controller is configured to: analyze a force image (e.g., force distribution) generated in response to application of a calibration force to the touch sensor surface; calculate a total force magnitude and/or a location and a magnitude of a global maximum in a force distribution across the array of drive electrode and sense electrode pairs based on the force image; and associate and/or store the total force magnitude and/or the location and magnitude of the global maximum as a local force response of the touch sensor to application of the calibration force at a corresponding location on the touch sensor surface. For example, the controller can integrate the force distribution (e.g., a three-dimensional Gaussian distribution centered around the location of the calibration input) to derive (e.g., calculate) the total force magnitude measured by the touch sensor in response to the calibration input. Additionally and/or alternatively, the controller can differentiate the force distribution to derive the location of a global maximum. The controller can then store the total force magnitude, the location of the global force maximum and/or or the value of the global force maximum as indicators of the touch sensor's local force response (e.g., local sensitivity, local output) in response to application of the calibration force at an associated location on the touch sensor surface.

The controller is configured to sequentially and/or concurrently execute this process for any number of calibration inputs to the touch sensor surface during a calibration cycle, thereby enabling the controller to calculate local force responses (and variations between local force responses) of the touch sensor at any number of discrete locations on the touch sensor surface.

Blocks of the second method S200 further recite: generating a corrected force response map representing variations in local force response across the surface of the touch sensor based on the magnitude of the calibration force and the local force response at each location in the set of locations at Block S220. Generally, the controller is configured to: aggregate local force responses or indicators of local force responses calculated for each calibration location; and generate a force compensation map (e.g., a function, an image, a lookup table, a matrix) between locations on the touch sensor surface and the observed (e.g., measured, calculated) and/or expected force responses at these locations. In one implementation, the controller can generate a continuous map (e.g., a three-dimensional curve, an image) between location on the touch sensor surface and expected force response (e.g., expected force output) of the touch sensor based on observed local force responses at a set of calibration locations. More specifically, the controller can: generate a surface orthogonal to the force axis representing a constant force value across the touch sensor surface (e.g., the magnitude of the calibration force); sequentially deform (e.g., pull up, pull down) the surface at each calibration location such that the force magnitude (e.g., height) of the surface corresponds to the observed force response of the touch sensor at that location; and correct the surface based on the magnitude of the calibration force (e.g., by subtracting out the magnitude of the calibration force). Thus, the controller can interpolate calibration data into a continuous map between locations on the touch sensor surface and corresponding differences between observed and expected force output values, thereby generating a mathematical representation of local variations (e.g., differences, inconsistencies) in the touch sensor's force sensitivity across the touch sensor surface.

For example, the calibration system can implement a calibration force equal to a target "click" force of 160 g. In this example, application of the calibration force at a first location $(x_1, y_1)$ on the touch sensor surface may yield a local force response (e.g., total force magnitude measured by the touch sensor) of 170 g, while application of the calibration force at a second location $(x_2, y_2)$ on the touch sensor surface may yield a local force response of 150 g. The controller can therefore generate a surface in $F(x, y)$ that is initially equal to the force magnitude (e.g., value) of the calibration force (e.g., a "click" force of 160 g) at all $(x, y)$ locations. Subsequently, the controller can deform (e.g., transform) the surface to equal 170 g at $(x_1, y_1)$ by "pulling up" the surface about $(x_1, y_1)$ while maintaining continuity of the surface. The controller can further: deform the surface to equal 150 g at $(x_2, y_2)$ by "pulling down" the surface about $(x_2, y_2)$; and repeat this process for other local force responses recorded at each calibration location.

The controller can then vertically translate the surface in order to correct the surface according to the magnitude of the calibration force (e.g., by subtracting 160 g from each (x, y, F) value). The resulting surface is therefore equal to the difference between an observed and expected force response (e.g., force output) of the touch sensor to the calibration force at each calibration location (e.g., +10 g at $(x_1, y_1)$, −10 g at $(x_2, y_2)$) and is roughly interpolated (e.g., continuous) between the set of calibration locations, thereby yielding a map (e.g., image) of observed and/or expected local variations in the force sensitivity of the touch sensor. The controller can further scale values of the (e.g., corrected) force response map proportional to the magnitude of the calibration force.

Blocks of the second method S200 further recite: storing an inverse of the corrected force response map as a force compensation map in a controller of the touch sensor at Block S240. Generally, the controller is configured: to generate a force compensation map (e.g., a force compensation map) by inverting the force response map relative to the force magnitude of calibration inputs and store the force compensation map generated based on these calibration inputs (e.g., according to the magnitude of calibration input). For example, the controller can invert a corrected force response image (e.g., derived at Block S220) over the (x, y) plane in order to generate a force compensation map defining a scaling value or scaling factor for each (x, y) location based on expected differences in force sensitivity of the touch sensor across the touch sensor surface (e.g., based on calibration data). Thus, the controller can generate and store a force compensation map (e.g., a continuous image, a matrix) such that the local force response (e.g., total force magnitude) registered by the touch sensor, when scaled according to the force compensation map, is equal to or approximately equal to the magnitude of the calibration force at each sampled calibration location.

While the second method S200 defines a calibration protocol for calibration inputs of a single force magnitude, the touch sensor can be configured to—in cooperation with the calibration system—sequentially or concurrently execute additional instances of the second method S200 for any number of other calibration forces (e.g., 5 g, 60 g, 500 g) in order to profile local variations in the force sensitivity of the touch sensor across a wide range of input forces, thereby enabling the touch sensor to accurately scale force outputs according to these variations.

2.2 Force Compensation

Generally, during detection and characterization of subsequent touch inputs (e.g., by a user), the controller is configured to: determine a location of an input on the touch sensor surface; access a force compensation map and/or a value of the force compensation map associated with the location of the input; and modify a force magnitude value and/or a force distribution measured by the touch sensor based on the force compensation map and/or the value of the force compensation map. More specifically, the controller can execute a scan cycle to sample resistance values from pressure sensor elements in the touch sensor and transform these resistance values into an input force distribution (e.g., associated with an input applied over the touch sensor surface). The controller can then calculate a location of the input based on the force distribution (e.g., the location of a global or local maximum in applied force). In one implementation, the controller can subsequently and/or concurrently transform the input force distribution according to the force compensation map (e.g., by composing the input force distribution with the force compensation map, by generating a superposition of the input force distribution and the force compensation map) and output a touch image that includes the transformed force distribution and the location of the input. Additionally and/or alternatively, the controller can: calculate a total force magnitude of the input based on the input force distribution; access a value of the force compensation map at the location of the input; and output a weighted (e.g., scaled, corrected) force magnitude based on the calculated total force magnitude and the value of the force compensation map.

Thus, the controller can scale the force magnitude and/or force distribution output by the touch sensor in real-time according to a stored force compensation map in order to: control for measured variations in force sensitivity between regions and/or locations on the touch sensor; reduce the effects of these variations on force magnitudes measured by the touch sensor; improve the consistency of haptic feedback controls relying on measured force magnitudes; and improve the consistency of force-sensitive command functions executed by an electronic device in response to touch inputs.

3. Third Method

As shown in FIG. 6, a third method S300 for calibrating the touch sensor includes: for each calibration location in a set of calibration locations on a surface of the touch sensor, receiving a calibration input of a predefined force magnitude at the calibration location at Block S310; sampling a set of resistance values between drive electrode and sense electrode pairs in a set of pressure sensor elements within the touch sensor at Block S312; transforming the set of resistance values into a force response magnitude at Block S314; calculating a scaling factor corresponding to the calibration location based on a difference between the force response magnitude and the predefined force magnitude at Block S316; generating a force compensation map based on the set of calibration locations and a set of corresponding scaling factors at S320; and storing the force compensation map in a controller at Block S330.

3.1 Applications

Generally, the third method S300 can be executed by the touch sensor—in conjunction with a calibration system—to calibrate input force thresholds across an area of the touch sensor, thereby compensating for structural variations within the touch sensor in order to interpolate force magnitudes between locations of discrete pressure sensor elements and achieve accurate and repeatable responses to inputs across the touch sensor—and thereby a population of touch sensors—as a function of applied force.

In particular, the touch sensor includes an array of discrete (e.g., discontinuous) pressure sensor elements (hereinafter the "pressure sensor array")—each including a drive electrode and sense electrode pair and a force sensitive material that exhibits changes in local bulk resistance responsive to applied force—that mechanically support and locate the tactile surface within a chassis of an electronic device. The controller can thus: read a resistance value from each pressure sensor element during a scan cycle; transform these resistance values into force magnitude components recorded at each pressure sensor element; and calculate a total magnitude of a force applied to the tactile surface and transferred into these pressure sensor elements based on these force magnitude components. However, because the touch sensor includes a small number of pressure sensor elements (e.g., twelve pressure sensor elements arranged beneath a 3-inch by 5-inch touch sensor surface), the touch sensor captures force data at a relatively low resolution. Thus, the touch sensor can execute a calibration cycle according to the third method S300 in order to: record resistance values across drive electrode and sense electrode pairs in each pressure sensor element responsive to inputs of controlled (e.g., known, predefined) calibration force magnitude at a set of known locations on the touch sensor surface; store force magnitude components experienced by each pressure sensor element based on these resistance values; and store a force compensation map, including scaling factors, that represents relationships between actual force magnitudes of inputs applied to the touch sensor surface and force magnitudes of these inputs measured by the touch sensor for each known location. Later, during operation, the controller can transform low-resolution force data sampled at the set of pressure sensor elements into a higher resolution force distribution across the tactile surface indicating the location of an input based on this calibration data, known locations of the pressure sensor elements, and known dynamics of the tactile surface. The system can therefore leverage calibration data captured at a large number of discrete locations during a calibration cycle to up-sample lower-resolution force data captured by the array of discrete pressure sensor elements.

Furthermore, because the touch sensor surface is supported only at a small number of locations, the touch sensor surface can exhibit deformations (e.g., warping, sagging) in particular locations under small or even net zero forces such that application of a particular force magnitude to one area of the touch sensor surface yields a different force measurement than application of the force magnitude to a different area of the touch sensor surface. During operation, the controller can therefore access the force compensation map when detecting and characterizing subsequent touch inputs (e.g., by a user) and scale the resulting force outputs of the second touch sensor in real time in accordance with known and/or calculated abnormalities in the force sensitivity of the touch sensor at the input location. The third method S300 can therefore: reduce variations in the touch sensor output between locations on the touch sensor surface; increase the accuracy of the force values and/or force distributions measured (e.g., calculated) by the second touch sensor; improve the consistency of force-dependent haptic feedback issued by the second touch sensor; and improve the consistency of force-dependent command functions executed by an electronic device cooperating with the second touch sensor in response to touch inputs. By enabling the touch sensor to correct and/or scale force measurements in software, the third method S300 allows the touch sensor to accurately and consistently measure forces around particular (e.g., calibrated) input force thresholds with a small number of pressure sensitive elements, thereby reducing manufacturing costs.

3.2 Touch Sensor

As shown in FIG. 6, in this variation, the touch sensor can include a controller and a set of pressure sensor elements arranged beneath a touch sensor surface at a set of discrete (e.g., discontinuous) locations. Each pressure sensor element includes: an interdigitated drive electrode and sense electrode pair (e.g., a point sensor) formed on a substrate (e.g., a fiberglass PCB layer); a deposit and/or layer of force-sensitive material bonded (e.g., affixed) to the substrate about its area; and a deflection spacer (e.g., a soft or ultra-soft silicone pad) that can be bonded to the chassis of an electronic device. In particular, the distance between each pressure sensor element in the touch sensor can be substantial relative to the dimensions of the touch sensor surface. For example, the touch sensor can include a set of discrete pressure sensor elements arranged beneath a 3-inch by 5-inch tactile surface at 1.5 inch lateral and longitudinal pitch distances, yielding a two-by-three grid array of pressure sensor elements under the touch sensor surface. In one variation, the system includes a high-resolution capacitive sensor array that is integrated into or arranged under the touch sensor surface.

In this configuration, the set of pressure sensor elements mechanically support the touch sensor surface and constrain the touch sensor surface against a chassis (e.g., a chassis of an electronic device) such that forces applied over the touch sensor compress and/or displace the force-sensitive material in the set of pressure sensor elements. The controller is therefore configured to sample resistance values across a drive electrode and sense electrode pair in each pressure sensor element (e.g., during a scan cycle) and to transform these resistance values into a force magnitude of an input applied over the touch sensor surface. In one variation, the controller is further configured to subsequently and/or concurrently sample a (much larger) set of capacitance values from the capacitive sensor array and transform the set of capacitance values into a location and/or size of the input on the touch sensor surface.

The second touch sensor can further cooperate with a calibration system (e.g., as described above with respect to the touch sensor) in order to execute a calibration cycle, such as the third method S300. In particular, the calibration system is configured to cooperate with an internal or external controller and with the touch sensor to apply a sequence of calibration inputs of a controlled (e.g., predefined) force magnitude over a set of locations (e.g., over a small area such as one square centimeter) on the touch sensor surface during a calibration cycle.

3.3 Calibration

Blocks of the third method S300 recite: for each calibration location in a set of calibration locations on a surface of the touch sensor, applying a calibration input of a predefined force magnitude at the calibration location at Block S310; sampling a set of resistance values between drive electrode and sense electrode pairs in a set of pressure sensor elements within the touch sensor at Block S312; and transforming the set of resistance values into a force response magnitude at Block S314. Generally, the second touch sensor is configured to receive controlled input forces of a predefined (e.g., fixed) calibration magnitude (or "calibration force") over a set of discrete locations on the touch sensor surface during a calibration cycle (e.g., applied by a probe on the calibration system). Concurrent with each application of the calibration force, the controller within the touch sensor can: drive a drive electrode in a pressure sensor element to a reference potential; sample a resistance value between a drive electrode and sense electrode pair in the pressure sensor element at a corresponding sense electrode; and transform the resistance value (or change in resistance) into a force magnitude component corresponding to the location of the pressure sensor element (e.g., based on a known model or a derived correlation). Concurrently and/or subsequently, the controller can repeat this process for each pressure sensor element in the touch sensor in order to sample force magnitude components measured at each pressure sensor element responsive to application of the calibration force.

Generally, the set of discrete pressure sensor elements constrains the touch sensor surface such that, in response to a calibration input or other input over the touch sensor surface, a first pressure sensor element at a first location beneath the touch sensor surface (e.g., adjacent the input location) may experience a first force magnitude component, while a second pressure sensor element at a different location may experience a second, substantially lower force magnitude component. Thus, the controller is configured to aggregate force magnitude components measured at each pressure sensor element in the touch sensor during a scan cycle and calculate a force response magnitude (e.g., total force magnitude response magnitude) of the touch sensor to an input (e.g., a calibration input) on the touch sensor surface based on a sum of force magnitude components measured at each pressure sensor element.

Blocks of the third method S300 further recite: calculating a scaling factor corresponding to the calibration location based on a difference between the force response magnitude and the predefined force magnitude at Block S316. Generally, the controller is configured to calculate a difference between the force response magnitude output by the touch sensor and the magnitude of the calibration force applied at a location on the touch sensor surface; correct the difference based on the magnitude of the calibration force; and invert the weighted difference as a scaling factor representing a difference between the actual and expected force responses of the touch sensor at the location. For example, if the calibration system applies a "click" force of 160 g at a location $(x_1, y_1)$ on the touch sensor surface and measures a force response magnitude of 170 g, the controller may calculate a difference between the two force magnitudes, divide the difference by 160 g, and invert the result, yielding a scaling factor of 16/17 at the location $(x_1, y_1)$.

During a calibration cycle, the controller can sequentially or concurrently repeat this process for each pressure sensor element in the touch sensor, thereby calculating a set of force response magnitudes (e.g., force sensitivities, force outputs) of the touch sensor and associated scaling factors corresponding to applications of the calibration force at each sampled location on the touch sensor surface. Additionally, the controller can store the individual force magnitude components measured at each pressure sensor element responsive to each calibration input.

Blocks of the third method S300 further recite: generating a force compensation map based on the set of calibration locations and a set of corresponding scaling factors at Block S320; and storing the force compensation map in a controller at Block S330. Generally, the controller is configured to aggregate scaling factors calculated for each calibration location on the touch sensor surface into a look-up table, a matrix, or other mapping, thereby generating a map between locations on the touch sensor surface, measured errors in force output of the touch sensor at each location, and corresponding scaling factors. The controller can then store the calibration, access scaling factors therein, and scale up or scale down a force output according to the scaling factor when detecting and characterizing subsequent inputs to the touch sensor surface.

While the third method S300 defines a calibration protocol for calibration inputs of a single force magnitude, the touch sensor can cooperate with the calibration system to sequentially or concurrently execute additional instances of the third method S300 for any number of other calibration forces (e.g., 5 g, 60 g, 500 g) in order to profile local variations in the force sensitivity of the touch sensor across a wide range of input forces, thereby enabling the touch sensor to accurately scale force outputs according to these variations.

In one variation, prior to executing the third method S300, the touch sensor can—in cooperation with the calibration system—individually calibrate each pressure sensor element. For example, the calibration system can sequentially apply a calibration input of a predefined (e.g., fixed) force magnitude to the back side of the touch sensor (e.g., a side of the touch sensor opposite the touch sensor surface) at the location of each pressure sensor element. Thus, the calibration system can sequentially compress each pressure sensor element against the tactile surface such that the calibration force is exerted on a single pressure element while the force on other pressure sensor elements is zero. The controller can then: sequentially execute scan cycles to calculate an output force magnitude based on a resistance value sampled at a drive electrode and sense electrode pair for each individual pressure sensor element; calculate a scaling factor for the each pressure sensor element based on differences between the output force magnitudes and the force magnitude of the calibration input; and store scaling factors for each pressure sensor element. The controller can then scale, correct, or otherwise modify force magnitude components measured at each pressure sensor element based on these scaling factors in order to both improve the accuracy of scaling factors calculated during a calibration protocol and improve the accuracy and consistency of touch sensor outputs in user-facing applications.

1.4 Force Compensation

Generally, during detection and characterization of subsequent touch inputs (e.g., by a user), the controller is configured to: determine a location of an input on the touch sensor surface; access a scaling factor associated with the location from a stored force compensation map; and modify a force output value of the touch sensor based on the scaling factor. More specifically, the controller can execute a scan cycle to sample resistance values from pressure sensor elements in the touch sensor and transform these resistance values into a force magnitude associated with an input applied over the touch sensor surface. In one variation, the controller can scan a set of capacitance values from the capacitive sensor array and calculate a location of an input on the tactile surface based on the set of capacitance values. In another variation, the controller can calculate a location of the input by matching the relative values of force magnitude components measured at each pressure sensor element to a similar set of force magnitude components stored in response to a calibration input at the location. The controller can then: access a scaling factor associated with the calculated location from a stored force compensation map (e.g., a look-up table, a matrix); weight (e.g., scale, correct) the force magnitude based on the scaling factor associated with the input location; and output the weighted force magnitude and the location of the input. For example, if the controller detects an input at location $(x_1, y_1)$ based on a capacitance image and an input force magnitude of 170 g, the controller can access the corresponding scaling factor 16/17 from a stored look-up table or matrix and multiply the input force magnitude by the scaling factor to yield an output force magnitude of 160 g, thereby compensating for the increased force sensitivity at $(x_1, y_1)$ measured during the calibration cycle.

Thus, the controller can adjust the force magnitude output by the touch sensor in real-time according to a force compensation map in order to: control for measured variations in force sensitivity between regions and/or locations on the touch sensor; reduce the effects of these variations on force magnitudes measured by the touch sensor; improve the consistency of haptic feedback controls relying on measured force magnitudes; and improve the consistency of force-sensitive command functions executed by an electronic device in response to touch inputs.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   at a calibration system during a calibration routine, applying a probe, at a target selection force, to a sequence of locations on a touch sensor surface of a touch sensor;
   at the touch sensor, capturing a sequence of touch images representing magnitudes of forces detected on the touch sensor surface during the calibration routine;
   fusing the sequence of touch images into a response map representing magnitudes of forces detected on the touch sensor surface by the touch sensor responsive to application of the target selection force on the touch sensor surface by the probe during the calibration routine;
   generating a force compensation map defining threshold forces for detecting selections at the target selection force on the touch sensor surface based on the response map; and
   during operation, at the touch sensor:
   capturing a first touch image representing magnitudes of forces detected on the touch sensor surface;
   based on the first touch image:
   detecting a first input at a first location on the touch sensor surface; and
   detecting a first force magnitude of the first input; and
   in response the first force magnitude exceeding a first threshold force assigned to the first location by the force compensation map, registering a first selection at the first location on the touch sensor surface.

2. The method of claim 1:
   wherein capturing the sequence of touch images comprises capturing the sequence of touch images, each touch image in the sequence of touch images comprising an array of pixels containing values representing force magnitudes carried by an array of drive electrode and sense electrode pairs during capture of the touch image;
   wherein fusing the sequence of touch images into the response map comprises:
   initializing the response map; and
   for each touch image in the sequence of touch images:
   detecting an input on the touch sensor surface based on a cluster of pixels in the touch image containing values deviating from corresponding baseline values;
   calculating a center of the input based on the cluster of pixels;
   calculating a detected total force magnitude of the input based on a combination of values contained in the cluster of pixels; and
   storing the detected total force magnitude in a pixel, in the response map, nearest the center of the input; and
   wherein generating the force compensation map comprises storing detected total force magnitudes contained in pixels in the response map as threshold forces for detecting selections at the target selection force, at corresponding locations on the touch sensor surface, in the force compensation map.

3. The method of claim 2:
   wherein detecting the first input at the first location on the touch sensor surface based on the first touch image comprises:
   detecting the first input on the touch sensor surface based on a first cluster of pixels in the first touch image containing values deviating from corresponding baseline values; and
   calculating a centroid of the first input, at the first location, based on the first cluster of pixels;
   wherein detecting the first force magnitude of the first input based on the first touch image comprises calculating the first force magnitude of the first input based on a first combination of values contained in the first cluster of pixels; and
   further comprising, in response to registering the first selection at the first location on the touch sensor surface, executing a haptic feedback cycle to vibrate the touch sensor surface.

4. The method of claim 1:
   wherein capturing the sequence of touch images comprises, at the touch sensor, for each touch image in the sequence of touch images:
   driving a set of drive electrodes in the touch sensor to a reference voltage;
   reading a set of sense voltages from a set of sense electrodes in the touch sensor, each sense electrode in the set of sense electrodes passing a voltage proportional to the reference voltage and a local contact resistance of a force-sensitive layer against the sense electrode, the force-sensitive layer exhibiting changes in local contact resistance against the sense electrode as a function of force applied to the touch sensor surface; and compiling the set of sense voltages into the touch image;

wherein fusing the sequence of touch images into the response map comprises representing magnitudes of voltages, passed by the set of sense electrodes responsive to application of the target selection force on the touch sensor surface by the probe during the calibration routine, in pixels in the response map corresponding to locations of the set of sense electrodes below the touch sensor surface; and wherein generating the force compensation map comprises generating the force compensation map defining magnitudes of voltages stored in the response map as threshold voltages for detecting inputs of force magnitudes greater than the target selection at corresponding locations on the touch sensor surface.

5. The method of claim 1, wherein applying the probe, at the target selection force, to the sequence of locations on the touch sensor surface during the calibration routine comprises applying the probe, at the target selection force of approximately 1.68 Newtons, to the sequence of locations on the touch sensor surface during the calibration routine.

6. The method of claim 1:
wherein applying the probe, at the target selection force, to the sequence of locations on the touch sensor surface during the calibration routine comprises drawing the probe along a boustrophedonic path across the touch sensor surface;
wherein fusing the sequence of touch images into the response map comprises:
initializing a sparse response map;
for each touch image in the sequence of touch images:
detecting an input on the touch sensor surface represented in a set of pixels in the touch image;
calculating a location of the input based on the set of pixels in the touch image;
calculating a detected total force magnitude of the input based on a combination of values contained in the set of pixels; and
storing the detected total force magnitude in a pixel, in the sparse response map, nearest the location of the input; and
interpolating between detected total force magnitudes, represented in pixels in the sparse response map, to generate a dense response map representing predicted total force magnitudes of inputs, at the target selection force, applied to locations on the touch sensor surface between segments of the boustrophedonic path; and
wherein generating the force compensation map comprises storing detected total force magnitudes and predicted total force magnitudes contained in pixels in the dense response map as threshold forces, for detecting inputs of force magnitudes greater than the target selection force at corresponding locations on the touch sensor surface, in the force compensation map.

7. The method of claim 1
wherein capturing the sequence of touch images during the calibration routine comprises, for each touch image in the sequence of touch images:

capturing a capacitance image representing a location of the probe applied to the touch sensor surface, by the calibration system, during a scan cycle;
capturing a force image representing a distribution of forces carried by a set of pressure sensors, supporting the touch sensor surface, during the scan cycle;
calculating a detected total force magnitude of an input at the location on the touch sensor surface based on a combination of forces in the distribution of forces represented in the force image; and
generating the touch image based on the capacitance image and the detected total force magnitude;
wherein fusing the sequence of touch images into the response map comprises:
initializing the response map; and
for each touch image in the sequence of touch images:
identifying a pixel, in the response map, corresponding to a location of the probe, applied to the touch sensor surface by the calibration system, represented in the touch image; and
writing a detected total force magnitude, stored in the touch image, to the pixel in the response map; and
wherein generating the force compensation map comprises storing detected total force magnitudes contained in pixels in the response map as threshold forces for detecting selections at the target selection force, at corresponding locations on the touch sensor surface, in the force compensation map.

8. The method of claim 1:
further comprising, at the touch sensor:
initiating the calibration routine in response to receipt of a calibration command from the calibration system; and
downloading a magnitude of the target selection force;
wherein generating the force compensation map comprises, at the touch sensor, generating the force compensation map based on the response map and the magnitude of the target selection force; and
further comprising, at the touch sensor, storing the force compensation map in local memory.

9. A method comprising:
at a calibration system during a calibration routine, applying a probe, at a reference force, to a sequence of locations on a touch sensor surface of a touch sensor;
at the touch sensor, capturing a sequence of touch images representing magnitudes of forces detected on the touch sensor surface during the calibration routine;
fusing the sequence of touch images into a response map representing magnitudes of forces detected on the touch sensor surface by the touch sensor responsive to application of the reference force on the touch sensor surface by the probe during the calibration routine;
generating a force compensation map defining correction functions for calibrating forces detected on the touch sensor surface based on the response map; and
during operation, at the touch sensor:
capturing a first touch image representing magnitudes of forces detected on the touch sensor surface;
based on the first touch image:
detecting a first input at a first location on the touch sensor surface; and
detecting a first uncorrected force magnitude of the first input; and
calculating a first force magnitude of the first input based on the first uncorrected force magnitude and a first correction function assigned to the first location by the force compensation map.

10. The method of claim 9:
wherein capturing the sequence of touch images comprises capturing the sequence of touch images, each touch image in the sequence of touch images comprising an array of pixels containing values representing force magnitudes carried by an array of drive electrode and sense electrode pairs during capture of the touch image;
wherein fusing the sequence of touch images into the response map comprises:
  initializing the response map; and
  for each touch image in the sequence of touch images:
    detecting an input on the touch sensor surface based on a cluster of pixels in the touch image containing values deviating from corresponding baseline values;
    calculating a center of the input based on the cluster of pixels;
    calculating a detected total force magnitude of the input based on a combination of values contained in the cluster of pixels; and
    storing the detected total force magnitude in a pixel, in the response map, nearest the center of the input; and
wherein generating the force compensation map comprises, for each pixel in the response map:
  calculating a force offset between the reference force and a detected total force magnitude stored in the pixel; and
  writing a correction function based on the force offset to a corresponding position in the force compensation map.

11. The method of claim 10:
wherein detecting the first input at the first location on the touch sensor surface based on the first touch image comprises:
  detecting the first input on the touch sensor surface based on a first cluster of pixels in the first touch image containing values deviating from corresponding baseline values; and
  calculating a centroid of the first input, at the first location, based on the first cluster of pixels;
wherein detecting the first uncorrected force magnitude of the first input based on the first touch image comprises calculating the first uncorrected force magnitude of the first input based on a first combination of values contained in the first cluster of pixels; and
wherein calculating the first force magnitude of the first input calculating the first force magnitude of the first input based on a sum of the first uncorrected force magnitude and a first force offset assigned to the first location by the force compensation map.

12. The method of claim 9:
wherein capturing the sequence of touch images comprises capturing the sequence of touch images, each touch image in the sequence of touch images comprising an array of pixels containing values representing force magnitudes carried by an array of drive electrode and sense electrode pairs during capture of the touch image;
wherein fusing the sequence of touch images into the response map comprises:
  initializing the response map; and
  for each touch image in the sequence of touch images:
    detecting an input on the touch sensor surface based on a cluster of pixels in the touch image containing values deviating from corresponding baseline values;
    calculating a center of the input based on the cluster of pixels;
    calculating a detected total force magnitude of the input based on a combination of values contained in the cluster of pixels; and
    storing the detected total force magnitude in a pixel, in the response map, nearest the center of the input; and
wherein generating the force compensation map comprises, for each pixel in the response map:
  calculating a scalar coefficient based on a ratio of the reference force to a detected total force magnitude stored in the pixel; and
  writing a correction function based on the scalar coefficient to a corresponding position in the force compensation map.

13. The method of claim 12:
wherein detecting the first input at the first location on the touch sensor surface based on the first touch image comprises:
  detecting the first input on the touch sensor surface based on a first cluster of pixels in the first touch image containing values deviating from corresponding baseline values; and
  calculating a centroid of the first input, at the first location, based on the first cluster of pixels;
wherein detecting the first uncorrected force magnitude of the first input based on the first touch image comprises calculating the first uncorrected force magnitude of the first input based on a first combination of values contained in the first cluster of pixels; and
wherein calculating the first force magnitude of the first input calculating the first force magnitude of the first input based on a product of the first uncorrected force magnitude and a first scalar coefficient assigned to the first location by the force compensation map.

14. The method of claim 9:
wherein fusing the sequence of touch images into the response map comprises:
  initializing the response map; and
  for each touch image in the sequence of touch images:
    detecting a first input on the touch sensor surface based on a first cluster of pixels in the touch image containing values deviating from corresponding baseline values;
    calculating a center of the first input based on the first cluster of pixels;
    calculating a first detected total force magnitude of the first input based on a first combination of values contained in the first cluster of pixels; and
    storing the first detected total force magnitude in a first pixel, in the response map, nearest the center of the first input;
further comprising:
  at the calibration system during a second segment of the calibration routine, applying the probe, at a second reference force, to the sequence of locations on the touch sensor surface;
  at the touch sensor, capturing a second sequence of touch images representing magnitudes of forces detected on the touch sensor surface during the second segment of the calibration routine;
  initializing a second response map; and for each touch image in the second sequence of touch images:
    detecting a second input on the touch sensor surface based on a second cluster of pixels in the touch image containing values deviating from corresponding baseline values;
    calculating a center of the second input based on the second cluster of pixels;
    calculating a second detected total force magnitude of the second input based on a second combination of values contained in the second cluster of pixels; and
    storing the second detected total force magnitude in a pixel, in the second response map, nearest the center of the second input; and
wherein generating the force compensation map comprises:
    for each pixel in the response map, calculating a first ratio of the reference force to a detected total force magnitude stored in the pixel;
    for each pixel in the second response map, calculating a second ratio of the reference force to a detected total force magnitude stored in the pixel; and
    for each drive electrode and sense electrode pair, in the touch sensor, represented in the force compensation map:
        calculating a nonlinear correction function based on the first ratio and the second ratio; and
        storing the nonlinear correction function, assigned to the drive electrode and sense electrode pair, in the force compensation map.

15. The method of claim 14:
wherein applying the probe, at the reference force, to the sequence of locations on the touch sensor surface during the calibration routine comprises applying the probe, at a target click force of approximately 1.68 Newtons, to the sequence of locations on the touch sensor surface during the first segment of the calibration routine; and
wherein applying the probe, at the second reference force, to the sequence of locations on the touch sensor surface during the calibration routine comprises applying the probe, at a target deep-click force greater than the target click force, to the sequence of locations on the touch sensor surface during the second segment of the calibration routine.

16. The method of claim 9:
further comprising:
    at the calibration system during the calibration routine, tracking a sequence of force magnitudes applied to the touch sensor surface by the probe; and
    generating a ground truth input map representing the sequence of force magnitudes; and
wherein generating the force compensation map comprises generating the force compensation map based differences between magnitudes of forces represented in the response map and cospatial forces represented in the ground truth input map.

17. The method of claim 16:
further comprising, during an alignment routine:
    at the calibration system, applying the probe to a set of target alignment locations on the touch sensor surface, the set of target alignment locations offset according to an alignment constellation within a calibration system coordinate system;
    at the touch sensor, capturing a set of alignment images representing a set of detected alignment locations detected on the touch sensor surface within a touch sensor coordinate system; and
further comprising:
    calculating a transform that projects the set of target alignment locations onto the set of detected alignment locations; and
    apply the transform to the ground truth input map to generate an aligned ground truth input map; and
wherein generating the force compensation map comprises generating the force compensation map based on differences between magnitudes of forces represented in the response map and cospatial force magnitudes represented in the aligned ground truth input map.

18. A method comprising:
at a touch sensor during a calibration routine, capturing a sequence of touch images representing magnitudes of forces detected on a touch sensor surface during application of a probe, at a reference force, to a sequence of locations on the touch sensor surface;
fusing the sequence of touch images into a response map representing magnitudes of forces detected on the touch sensor surface by the touch sensor responsive to application of the reference force on the touch sensor surface by the probe during the calibration routine;
generating a force compensation map defining threshold forces for detecting selections at the reference force on the touch sensor surface based on the response map; and
during operation, at the touch sensor:
    capturing a first touch image representing magnitudes of forces detected on the touch sensor surface;
    based on the first touch image:
        detecting a first input at a first location on the touch sensor surface; and
        detecting a first force magnitude of the first input; and
    in response the first force magnitude exceeding a first threshold force assigned to the first location by the force compensation map, registering a first selection at the first location on the touch sensor surface.

19. The method of claim 18:
wherein applying the probe, at the reference force, to the sequence of locations on the touch sensor surface during the calibration routine comprises applying the probe, at a target click force of approximately 1.68 Newtons, to the sequence of locations on the touch sensor surface during the calibration routine; and
further comprising, in response to registering the first selection at the first location on the touch sensor surface, executing a haptic feedback cycle to vibrate the touch sensor surface.

20. The method of claim 18:
wherein fusing the sequence of touch images into the response map comprises:
    initializing the response map; and
    for each touch image in the sequence of touch images:
        detecting an input on the touch sensor surface based on a cluster of pixels in the touch image containing values deviating from corresponding baseline values;
        calculating a center of the input based on the cluster of pixels;
        calculating a detected total force magnitude of the input based on a combination of values contained in the cluster of pixels; and storing the detected total force magnitude in a pixel, in the response map, nearest the center of the input; and wherein generating the force compensation map comprises storing detected total force magnitudes contained in pixels in the response map as threshold forces for detecting selections at the reference force, at corresponding locations on the touch sensor surface, in the force compensation map.

\* \* \* \* \*